United States Patent
Lee et al.

(10) Patent No.: US 9,681,468 B2
(45) Date of Patent: Jun. 13, 2017

(54) JOINING COMMUNICATION GROUPS WITH PATTERN SEQUENCED LIGHT AND/OR SOUND SIGNALS AS DATA TRANSMISSIONS

(71) Applicant: QUALCOMM Incorporated, San Diego, CA (US)

(72) Inventors: Arthur Lee, San Diego, CA (US); Mark A Lindner, Superior, CO (US)

(73) Assignee: QUALCOMM Incorporated, San Diego, CA (US)

(*) Notice: Subject to any disclaimer, the term of this patent is extended or adjusted under 35 U.S.C. 154(b) by 601 days.

(21) Appl. No.: 13/969,706

(22) Filed: Aug. 19, 2013

(65) Prior Publication Data
US 2014/0056172 A1   Feb. 27, 2014

Related U.S. Application Data

(60) Provisional application No. 61/692,817, filed on Aug. 24, 2012.

(51) Int. Cl.
*H04W 76/02* (2009.01)
*H04M 1/215* (2006.01)
(Continued)

(52) U.S. Cl.
CPC .......... *H04W 76/02* (2013.01); *H04B 10/116* (2013.01); *H04B 10/1149* (2013.01);
(Continued)

(58) Field of Classification Search
None
See application file for complete search history.

(56) References Cited

U.S. PATENT DOCUMENTS 7,721,216 B2   5/2010   Zaner et al.
7,850,067 B1   12/2010   Persson et al.
(Continued)

FOREIGN PATENT DOCUMENTS

EP   1906696   *   4/2008
EP   1906696 A1   4/2008
(Continued)

OTHER PUBLICATIONS

International Search Report and Written Opinion—PCT/US2013/055822—ISA/EPO—Dec. 3, 2013.

*Primary Examiner* — Ayaz Sheikh
*Assistant Examiner* — Sori Aga
(74) *Attorney, Agent, or Firm* — The Marbury Law Group

(57) ABSTRACT

A method for joining a communication group by receiving and processing light and/or sound signals in a mobile device. The signaling may be light or audible signals, such as lights and/or music, that may be emitted in particular sequences. The mobile device may receive the light and/or sound signals with sensors, such as cameras and/or microphones, and may process the light and/or sound signals to obtain information encoded within the signals. The mobile device may decode detected signaling information and identify connectivity data that may be used to join and transmit messages to the communication group. In an embodiment, light and/or sound signals related to unknown third parties may be used by the mobile device to identify the third party based on queries to the communication group. In an embodiment, the mobile device may determine parameters for receiving and/or transmitting signals based on ambient conditions, such as ambient noise.

84 Claims, 19 Drawing Sheets

(51) Int. Cl.
*H04M 1/725* (2006.01)
*H04M 1/737* (2006.01)
*H04B 10/114* (2013.01)
*H04B 10/116* (2013.01)
*H04B 11/00* (2006.01)
*H04W 4/00* (2009.01)
*H04W 4/08* (2009.01)

(52) U.S. Cl.
CPC ............ *H04B 11/00* (2013.01); *H04M 1/215* (2013.01); *H04M 1/7253* (2013.01); *H04M 1/737* (2013.01); *H04W 4/005* (2013.01); *H04W 4/08* (2013.01)

(56) References Cited

U.S. PATENT DOCUMENTS

| | | | |
|---|---|---|---|
| 2005/0120305 A1* | 6/2005 | Engstrom | G06Q 30/02 715/760 |
| 2008/0281515 A1* | 11/2008 | Ann | G01C 21/20 701/434 |
| 2010/0110088 A1 | 5/2010 | Lee et al. | |
| 2011/0193779 A1 | 8/2011 | Williams | |
| 2011/0225510 A1 | 9/2011 | Lavrov et al. | |
| 2012/0045215 A1 | 2/2012 | Kim et al. | |
| 2012/0051187 A1* | 3/2012 | Paulson | H04B 1/06 367/135 |
| 2013/0176984 A1* | 7/2013 | Koezuka | H04B 11/00 370/329 |
| 2015/0312406 A1* | 10/2015 | Yan | G06Q 50/01 455/414.1 |

FOREIGN PATENT DOCUMENTS

| | | |
|---|---|---|
| JP | 2004221924 A | 8/2004 |
| KR | 200900009484 A | 1/2009 |
| WO | 0031994 A1 | 6/2000 |
| WO | 2005055566 A1 | 6/2005 |
| WO | WO 2005/055566 * | 6/2005 |

* cited by examiner

US 9,681,468 B2

JOINING COMMUNICATION GROUPS WITH PATTERN SEQUENCED LIGHT AND/OR SOUND SIGNALS AS DATA TRANSMISSIONS

RELATED APPLICATIONS

The present application claims the benefit of priority to U.S. Provisional Application No. 61/692,817, entitled "Method for Joining Communication Groups With Pattern Sequenced Light and/or Sound Signals as Data Transmissions" filed Aug. 24, 2012, the entire contents of which are hereby incorporated by reference.

BACKGROUND

Modern mobile device users typically take their mobile devices everywhere. For example, users may take their smartphones, tablet mobile devices, and other mobile devices to the gym, church, nightclubs, college classes, and other social gathering locations. However, while at the various travel destinations, social organizations, events, etc., the users may not have an efficient way of establishing group communications with the other users attending the events or identifying with the locations. Strangers in a common location may not be able to safely and efficiently contact each other regarding their common interests, as conventional methods of establishing group communications with interest groups may require protracted messaging, requests for contact information, and discovering appropriate web presences. Users intending to join communication groups with similarly-minded and/or concurrently located people need an easier method of finding and joining communication groups.

SUMMARY

The various embodiments provide methods for establishing communication groups based on light and/or sound signal transmissions. To avoid tedious processes to connect mobile users having common interests, groups, such as nightclub interest groups, church organizations, and music appreciation clubs, may broadcast light signals and/or sound signals that may be received by mobile devices and converted into information the mobile devices may use to join the groups. As mobile devices typically include light sensors, cameras, and microphones, devices associated with groups may use light and sound signals, such as flashing lights, flashing colors, and emitting sounds, to broadly advertise communication group connectivity information. Groups may use signaling devices, such as speakers, strobe lights, or light emitting diode (LED) displays, to emit various light and/or sound signals, such as images, lights, visuals, sounds, and music, in particular patterns, sequences, and techniques. Mobile devices that can view or hear the signaling devices may use sensors to receive the signals emitted by the signaling devices, and may evaluate the received signals to detect embedded messages that instruct the mobile devices regarding how users may contact and join the associated communication groups.

In an embodiment, the light and/or sound signals may include imagery or other identifying information of unknown third-parties close to the mobile device and/or the signaling device. Upon receiving such identifying information, the mobile device may leverage membership in a communication group to determine the identity of the unknown third-party. For example, the mobile device having joined a Facebook group of a nightclub may identify an unknown person recorded within data received by a camera by requesting other members of the communication group to respond with identifications. In another embodiment, a mobile device may sample ambient conditions, such as ambient noise and ambient light, to determine various parameters for receiving and/or transmitting light and/or sound signals. For example, when in a noisy location, a mobile device may monitor for incoming sound signals on a particular frequency. In another embodiment, a mobile device may utilize either sound signals or light signals that are concurrently received. For example, when light signals are interrupted or otherwise not useable, the mobile device may utilize sound signals that include similar signaling information.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
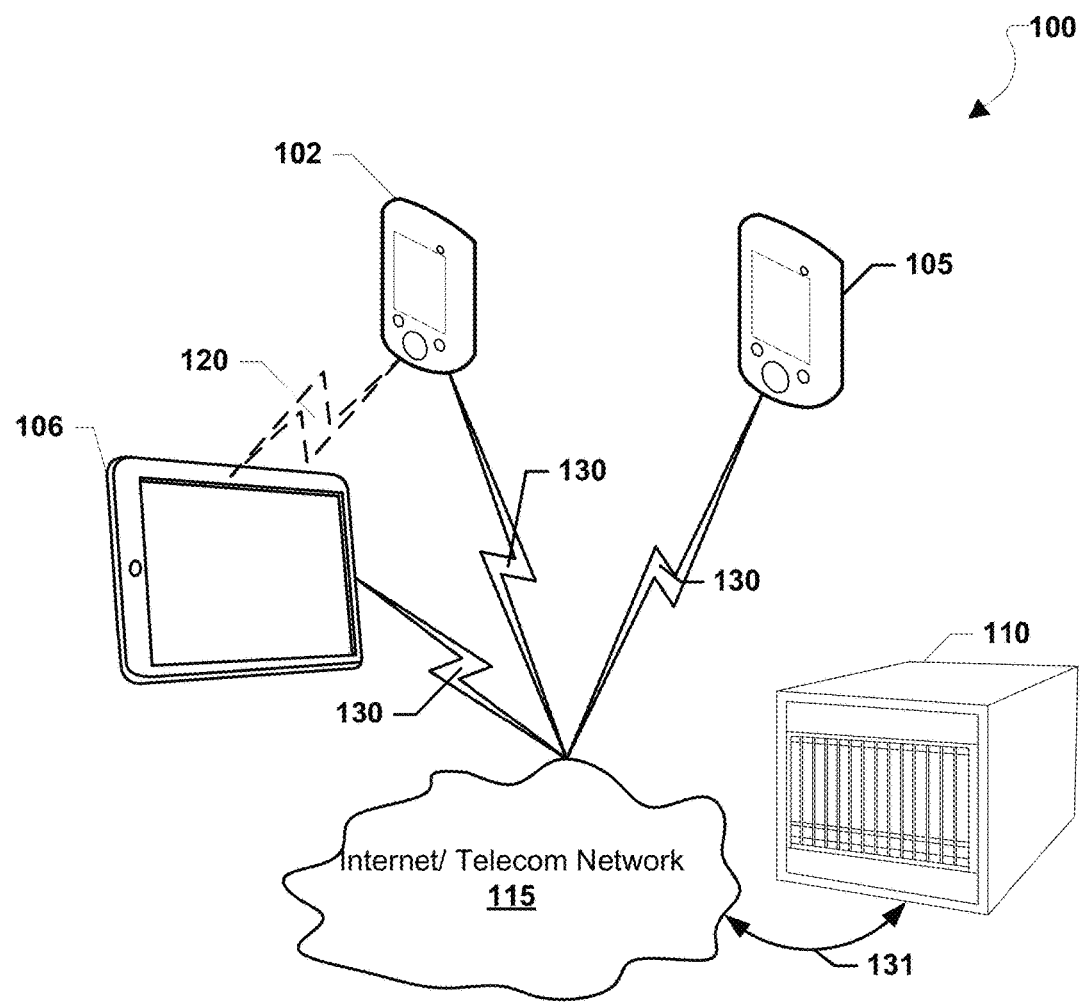
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, and similar personal electronic devices which include a programmable processor, memory, and circuitry at least capable of sending and/or receiving wireless and/or wired data transmissions, accessing local or remote database structures, and performing various calculations.

The various embodiments communicate information for joining communication groups using light and/or sound signals. Light signals and sound signals share the unique characteristics that they have a limited transmission range (i.e., within line-of-sight and within earshot) and can be emitted from a number of common signal emitters, such as light emitters (e.g., lights, touchscreen displays, and projectors) and sound emitters (e.g., speakers). Light signals may be visible (i.e., perceptible to the human eye) or invisible, and sound signals may be audible or inaudible. Light signals can be received and processed by light sensors (e.g., cameras) and sound signals can be received by microphones on mobile devices. Information may be encoded in light signals in any combination of various light elements, such as light flashes, colors, and imagery (e.g., photos, projections, videos, symbols, etc.). Information may be encoded in sound signals in a variety of sound elements, such as beeps, voices, noise, clicks, ultrasounds, tones, and musical notes. Imperceptible light and/or sound signals may be imperceptible by people but detectable by machine sensors. For example, infrared light and/or ultraviolet light may be used to send light signals, and while such wavelengths are not perceptible by people, they may be detected by a camera or other machine light sensor (i.e., a ultraviolet light sensor or infrared sensor). Thus, light signals may include any combination of light or light elements that can be detected and processed by a mobile device employing light-detecting sensors (e.g., cameras, ultraviolet light sensor, infrared sensor, etc.). As another example, a mobile device may detect infrasound or ultrasound that a human ear cannot perceive. So, similar to light signals, sound signals may include any sound or sound element that can be detected and processed by the mobile device employing sound-detecting sensors (e.g., microphones, tuning forks, etc.). The embodiments may also be applicable to other types of sensory information when sensors for such types are available on a computing device, such as vibrations, olfactory information (e.g., smells), and gustatory information (e.g., tastes).

For ease of reference, the term "light element" is used herein and in the claims to refer in general to all of the features of light that can be used in the various embodiments to encode information, and include in particular brightness, color, images, and flash patterns (i.e., alternating periods of light and no light of various durations). Similarly, the term "sound elements" is used herein and in the claims to refer in general to all features of sound, including infrasound and ultrasound, that can be used in the various embodiments to encode information, and include in particular tone or notes (i.e., sound frequency), pitch, volume, beeps or pulses (i.e., alternating periods of sound and no sound of various durations), and combinations of these features such as in the form of musical notes.

The term "signaling information" is used herein to refer to particular patterns, manners, sequences, durations, or manifestations of emitted light and/or sound signals that correspond to a predefined signaling language. For example, signaling information may include particular sequences of modulating light and/or sound signals, such as strings of differing musical notes, changing images, or flashing lights of varying colors and periodicity. A mobile device may identify signaling information within received light and/or sound signals by matching sequences of the light and/or sound signals with predefined sequences in the signaling language. In an embodiment, the signaling language may be stored sets of predefined patterns of light and/or sound signals and corresponding data, software instructions, or values for the predefined patterns. Identified signaling information may be decoded or otherwise converted based on the signaling language to determine messages, data, instructions, directions, or any other information that may be used by a mobile device. In an embodiment, signaling information may be detected based on a combination of sound elements including the tone, pitch or frequency of sound signals and timing of emitted sound. For example, a signaling language may define predefined patterns as sequences of musical notes compared to a period of time. In other words, signaling information may be determined to exist when specific sounds are emitted at specific pacing.

The term "connectivity data" is used herein to refer to any data or information that indicates the identity, characteristics, type, and/or contact information of a communication group that may be used by a mobile device to communicate with devices and/or members associated with the communication group. For example, connectivity data may be an Internet protocol (IP) address to a server, local area network (LAN), or other digital site that is affiliated with a collective, union, club, association, organization, affinity group, etc. As another example, connectivity data may be a uniform resource locator (URL) (e.g., a website address), website portal information, an IP routable address, or an email address related to a particular interest or affinity group. Connectivity data may also describe a social media communication space, such as Facebook connection information, or an online communication channel, such as Twitter feed information, a resource description framework (RDF) site summary feed information or rich site summary (RSS) feed information, a session initiation protocol (SIP) uniform resource identifier (URI), or an e-mail group (e.g., listserv information).

The term "signaling device" is used herein to refer to any device, such as mobile devices described above, that may be deployed to emit, display, broadcast, or otherwise emit light and/or sound signals for receipt by mobile devices. Examples of signaling devices may include mobile devices, monitors, televisions, loudspeaker systems, and lighting systems. Signaling devices may include a programmable processor, memory, and circuitry at least capable of storing and periodically emitting light and/or sound signals. Signaling devices may also include circuitry capable of sending and/or receiving wireless and/or wired data transmissions, accessing local or remote database structures, and performing various calculations. For example, signaling devices may download, receive, and/or access signaling information from a server for emitting. Signaling devices configured to emit light signals may include at least a display unit, such as a liquid-crystal display (LCD) or LED screen, a cathode ray tube (CRT) screen, a light bulb, an LED indicator, or any other light emitter that can emit light that encodes information (i.e., light that can be received by machines). Signaling devices configured to emit sound signals may include at least a speaker unit (or sound emitter) capable of emitting various sounds. In an embodiment, such speaker units may be configured to emit sound signals that cannot be detected by the human ear, such as particular high frequency sounds. In an embodiment, signaling devices configured to emit tactile signals may include at least a vibration motor, piston, solenoid, or other unit capable of creating a vibration, wave, or other physical disturbance.

The various embodiments provide methods for a mobile device joining a communication group based on receiving light and/or sound signals that are emitted to provide to recipients information for joining the communication group, such as a URL, group call information, etc., which is sometimes referred to herein as "connectivity data." In general, an organizing party (or group owner), such as a club, organization, affinity group, or any other collective, may establish a communication group in which users having common interests, traits, or location may join and communicate with other users. Examples of communication groups may include websites, computer networks, social media forums, and any other platform with which users may gain access and transmit messages to one another.

A signaling device associated with the communication group may be configured to emit light and/or sound signals, such as visible imagery, lights, colors, and sounds. The light and/or sound signals may be emitted by the signaling device in particular sequences, timing, and arrangements. For example, the signaling device may emit a sequence of bright lights such that the light regularly goes on and off. As another example, the signaling device may emit a sequence of audible tones that includes tones of varying pitches or frequency and/or of varying duration. The sequences of emitted light and/or sound signals may include signaling information, which may be particular sequences or patterns of emitted light and/or sound signals that correspond to a predefined signaling language. For example, signaling information may be light signals that is emitted with a frequency and timing that is defined by a signaling language. The signaling device may emit light and/or sound signals such that it contains signaling information that indicates the connectivity data regarding the communication group. For example, the signaling device may emit flashing lights of various durations in a sequence that, based on the signaling language, can be decoded to indicate an IP address for the communication group. In various embodiments, the signaling device may continually, or alternatively, periodically emit the light and/or sound signals that contain(s) signaling information.

When within proximity of the signaling device, a mobile device may receive the light and/or sound signals from the signaling device by utilizing associated sensor devices, such as cameras and microphones, configured to collect images, visuals, sounds, and other light and/or sound signals. For example, the mobile device with an activated camera may receive light signals emitted by the signaling device. With received light and/or sound signals, the mobile device may process the light and/or sound signals to detect signaling information. In an embodiment, the mobile device may execute an application (or "app") that recognizes a common signaling language as the signaling device. If the mobile device determines signaling information to be within the received light and/or sound signals, the mobile device may convert or decode the signaling information into a message, data, or other information. For example, a received sequence of flashing lights imagery or modulating sounds may be determined to correspond to a sequence of signaling information defined in a common signaling language stored on the mobile device. The mobile device may evaluate the decoded signaling information to determine whether it relates to connectivity data for a communication group. For example, the mobile device may evaluate decoded signaling information as a valid IP address or URL. If the decoded signaling information indicates connectivity data, the mobile device may use the connectivity data to transmit messages to the communication group. In an embodiment, the mobile device may transmit join messages that request membership in the communication group. In various other embodiments, once joining a communication group, the mobile device may transmit messages to the communication group and/or other members. For example, the mobile device may retrieve contact addresses for all current members of the communication group from a group server and may transmit emails to all retrieved contact addresses.

As an exemplary illustration, while in a nightclub, a user's smartphone mobile device may receive light and/or sound signals emitted by a strobe light signaling device. The mobile device may execute an app that detects signaling information within the received light and/or sound signals and decodes the signaling information to identify a URL to a SIP URI for a communication group associated with the nightclub. The user may connect to the communication group via the URL and transmit messages to other people connected in the nightclub, leave voice note messages on a communication group server for later playback on the communication group website, and post comments to an open-access communication group message board (e.g., a Twitter feed).

In an embodiment, the mobile device may also employ accelerometers to detect vibration signals emitted by the signaling device. For example, low base played from a speaker may produce vibrations that may be detected by accelerometers but not by a microphone.

In an embodiment, light and/or sound signals may be used to present connectivity data for communication groups designed for contents, sweepstakes, and other consumer incentives. For example, sound signals may be generated by a radio station and emitted by a user's stereo such that when the user's mobile device receives the sound signals, it may decode the light and/or sound signals to detect a URL associated with a listener contest for event tickets.

In an embodiment, the user's mobile device may determine an unknown third-party's identity based on imagery and/or sounds relating to the third-party received concurrently with light and/or sound signals. The imagery and/or sounds relating to the third-party may be referred to as "representations" of the third-party. For example, the mobile device may capture video imagery of the unknown third-party while receiving flashing light signals for joining a communication group. Once the mobile device gains access to the communication group based on processing of the light and/or sound signals, the mobile device may also isolate the imagery and/or sounds related to the unknown third-party and transmit queries to the communication group requesting identification information about the unknown third-party. The mobile device may alternatively isolate and transmit queries based on distinctive light elements related to the unknown third-party, such as clothes, hair, branding, logos, patches, etc. In an embodiment, the mobile device may send query messages to all members of the communication group related to the light and/or sound signals containing the representations of the unknown third-party. In another embodiment, the mobile device may transmit the unknown third-party representations to a group server which may transmit messages to members, conduct identifying operations (e.g., facial recognition or voice recognition operations), and utilize stored data information to identify the unknown third-party. If the mobile device receives the identity and contact information of the unknown third-party, the mobile device may transmit direct communications. In various embodiments, the mobile device may isolate and use light signals, sound signals, or a combination of both to identify the unknown third-party. For example, the mobile device may use received imagery and sounds to perform lip movement analysis to determine the voice of the unknown third-party. In another embodiment, the unknown third-party may emit light and/or sound signals that can describe his/her identity. For example, a smartphone carried by the unknown third-party may emit a sequences of flashing lights that can be decoded as a description of his/her name, email, etc.

In environments with significant noise (e.g., competing signals), light or sound signals rendered by a signaling device may not be detected or distinguished by a mobile device. In other words, the light or sound signals may not be "viewable" or "hearable" by the mobile device's sensors. In another embodiment, to ensure the receipt by mobile devices of sequences of rendered light or sound signals and their encoded signaling information, the signaling device may periodically adjust the format or manner with which light or sound signals are rendered and/or use combinations of both light and sound signals. For example, the signaling device may periodically alternate emitting a sequence of light signals in a first color or segment of the infrared spectrum with emitting a sequence of light signals in another color or a second segment of the infrared spectrum. As another example, the signaling device may periodically alternate emitting sound signals at a first frequency with emitting sound signals at a second frequency. Such light or sound signals emitted at different frequencies may represent redundant or similar signaling information and may be emitted by the signaling device to provide more accessible light or sound signals to the mobile device in various environments. In another embodiment, the signaling device may concurrently emit combinations of light and sound signals to ensure encoded signaling information is received by the mobile devices. For example, the signaling device may emit a sequence of sound signals and a sequence of light signals that both may be decoded by the mobile device to communicate the same or similar signaling information. The signaling device may emit the light and sound signals in combination and at the same time, or alternatively, may periodically alternate emitting the light and the sound signals. In an embodiment, adjustments to the emitted light and/or sound signals and the combination of varying formats or manners of emitted light or sound signals may be executed by the signaling device based on detected user inputs (e.g., a user soft button input on a graphical user interface, a short-range radio signal, etc.). In various embodiments, the mobile device may also vary the emission of redundant or complementary sound and/or light signals to ensure receipt by the signaling device.

As an exemplary illustration, a user within a restaurant may use his/her mobile device to emit sound signals at different frequencies to control a nearby jukebox signaling device that is configured to process signaling information. The mobile device may emit sound signals encoding signaling information that the jukebox signaling device is configured to process as commands for playing a different song, skipping a current song, gathering information for a vote from multiple patrons for playing certain songs, etc. As the restaurant may be very loud due to the jukebox and/or patron voices, the jukebox signaling device may not detect the sound signals emitted by the mobile device in a first frequency. To increase the chance that the signals are received, the mobile device may emit a sound signal at a much lower frequency that the jukebox signaling device may detect, distinguish, or otherwise "hear" over the noise. Alternatively, the jukebox signaling device may also be configured to detect and process light signals, and the mobile device may emit a sequence of light signals (e.g., flashes a light towards the jukebox's camera) to communicate the signaling information to the jukebox signaling device.

The various methods and techniques described herein are not intended to be used with telephonic communications, such as telephone calls. Unlike conventional telephonic communications, which may employ sound tones (e.g., touch tones or dial tones) to indicate phone numbers to be contacted, the methods and techniques of the various embodiments do not utilize telephonic communications sound tones to create connectivity between users. Additionally, the various embodiments do no communicate phone numbers through emitted light and/or sound signals. Instead, the various embodiments may utilize sound to deliver connectivity data, such as SIP URI and IP addresses, to be detected and decoded by mobile devices within proximity of nearby signaling devices to enable the connection of users to communication groups associated with the nearby signaling devices. In other words, unlike telephonic communications, sound signals used with regards to the various embodiments contains information for finding and joining with communication groups, not the actual means for connecting known users via telephone.

Additionally, a distinction may be made between the various embodiments and metadata, or data packets, delivered via radio transmissions. Unlike certain communication protocols, such as Radio Data System (RDS), the various embodiments may utilize the actual received, sound signals, as opposed to signals which transmit data, to determine and identify communication groups and associated contact information. Here, with no data transmitted, but only sound signals, the source of sound signals is irrelevant, as patterns or sequences of sound signals may be decoded to create information for contacting communication groups.

Further, the various embodiments should be differentiated from speech recognition analysis or techniques, as the embodiment methods facilitate connectivity to communication groups based on determining connectivity data from decoded sound signals. Unlike speech recognition, the embodiment methods may not interpret spoken audio information to determine the meaning or values of the spoken audio (e.g., convert audio words into computer-recognizable versions of those same words), but instead may translate sound element sequences into information used for establishing connectivity with communication groups (e.g., convert sequences of tones into a SIP URI, web portal address, etc.).

FIG. 1 illustrates a communication system 100 suitable for use with the various embodiments. The system 100 may include a user's mobile device 102 (e.g., a smartphone computing device), a nearby signaling device 105, and a nearby tablet mobile device 106 (e.g., a tablet computing device). Each of the devices 102, 105, and 106 may include a cellular network wireless modem chip that enables communication via a cellular network and a global positioning system (GPS) receiver, which may generate GPS coordinates of the device. The devices 102, 105, and 106 may contain processing units capable of handling network communications and may access the Internet/telecommunications network 115 capable of supporting high bandwidth required for real-time video streaming (e.g., local area network (LAN), wireless local area network (WLAN), 4G, LTE, etc.). In an embodiment, the devices 102, 105, and 106 may connect to the Internet/telecommunications network 115 via wireless data links 130 and exchange wireless communications with a cell tower (not shown). In another embodiment, the devices 102, 105, and 106 may access the Internet/telecommunications network 115 over wireless data links 130 and may exchange wireless communications (e.g., WiFi) with a wireless router (not shown) having a wired or wireless connection to a wide area network (WAN) and/or the Internet/telecommunications network 115.

The user's mobile device 102 may exchange data with a server 110 (e.g., a cloud computing server). The server 110 may maintain databases of contact information for particular groups or classifications of persons (e.g., an employer server with information records for each employee), for social media associations (e.g., Facebook®, Twitter®, LinkedIn®, Foursquare® account data, user names, etc.), and for geographical regions (e.g., by city, county, state, country, etc.). The server 110 may also contain video/audio data uploaded by various devices, such as the user's mobile device 102, and may relate such video/audio data with contact information within the database. Additionally, the server 110 may transmit messages to the devices 102, 105, 106 in response to receiving wireless transmissions via the Internet/telecommunications network 115 using the connection 131. For example, if the user's mobile device 102 transmits a query message requesting information about a particular group association (e.g., member contact information), the server 110 may transmit a denial of service message when the user is not registered with the group association, or alternatively, may transmit a response message with the requested contact information. In various embodiments, the server 110 may be a remote server or alternatively a local server that is centrally reachable and well-known to members of a communication group.

The user's mobile device 102 may exchange data and/or messages with a nearby tablet mobile device 106 and the signaling device 105 by using peer-to-peer computing techniques or, if the contact information for the various devices is known, the user's mobile device 102 may also communicate with the devices 105, 106 through Internet/telecommunications network 115 transmissions. For example, the user's mobile device 102 may transmit a wireless signal via wireless data link 130 to a message router (not shown) of a local area network which may relay the message to the nearby tablet mobile device 106. In an embodiment, the user's mobile device 102 may exchange short-range wireless transmissions 120 (e.g., Bluetooth®, Zigbee®, RF radio, etc.) with other devices equipped with wireless transceivers, such as the tablet mobile device 106 located near the user's mobile device 102. For example, the user's mobile device 102 may transmit ping messages that may be received and responded to by the nearby tablet mobile device 106 employing similar transceivers and communication protocols. In an embodiment, the user's mobile device 102, the signaling device 105, and the nearby tablet mobile device 106 may exchange transmissions with the server 110. For example, the server 110 may transmit requests for information from the various devices 102, 105, 106 using communications such as email or software-specific transmissions (e.g., client-server software communications).

Figure 2A:
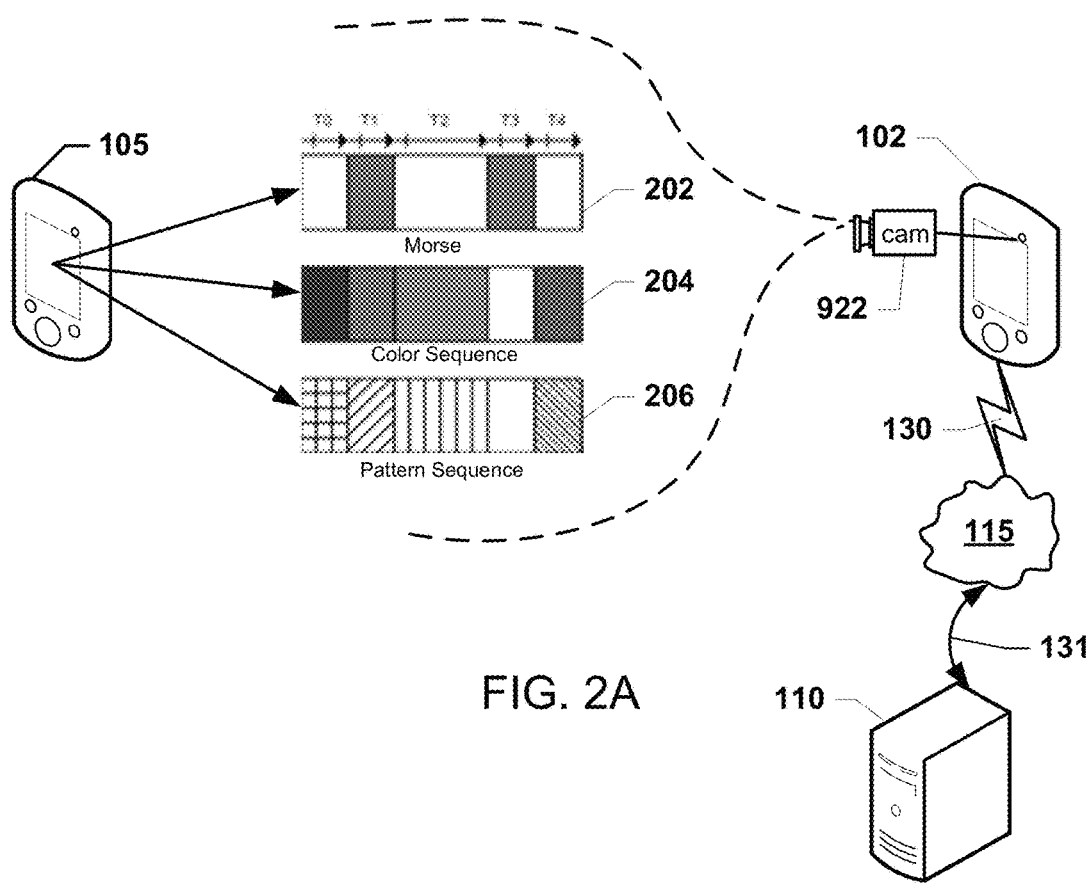
FIG. 2A is a diagram illustrating a mobile device receiving light signals with a camera.

FIG. 2A is a diagram illustrating a user's mobile device 102 receiving visible signaling information with a camera. When within a certain proximity, the user's mobile device 102 may detect light and/or sound signals emitted by a nearby signaling device 105, which may be processed and transmitted via a data link 130 to a server 110 connected via a data link 131 to a Internet/telecommunications network 115. As described above, light and/or sound signals may be used to signal connectivity data which may used to join the user's mobile device 102 (and the user) with a communication group associated with the signaling device 105.

The user's mobile device 102 may contain a camera 922 configured to capture, buffer and/or store imagery and other visible information. For example, the camera 922 may receive imagery of a user of the signaling device 105. As another example, the camera of the user's mobile device 102 may receive imagery that may be transmitted in a video conference call. The camera 922 may be affixed to or embedded within the housing or other components of the user's mobile device 102 such that imagery detected by the camera 922 may be received and used by the user's mobile device 102. For example, the camera 922 may be placed within the back side of a smartphone mobile device 102. In another embodiment, the camera 922 may be connected to the user's mobile device 102 via a wired or wireless connection. For example, the camera 922 may be connected to the user's mobile device 102 via a short-range radio link (e.g., Bluetooth, Zigbee, RF, etc.).

In an embodiment, the camera 922 may be configured to detect light signals (e.g., imagery or visuals) using low-light or infrared capturing techniques and/or filters. For example, the camera 922 may detect the features of a human face in the absence of ambient light. In various embodiments, the camera 922 may record still images or imagery in motion, and may output data as still photographic images, video files, or streaming video data utilizing various encodings and formats.

The user's mobile device 102 may be within proximity of the signaling device 105 and positioned such that the devices 102, 105 may be within a direct line-of-sight. For example, the user's mobile device 102 may be near the signaling device 105 in a nightclub, amphitheater, classroom, boardroom, park, or any other location or installation in which the users of the devices 102, 105 and located so the users of the devices 102, 105 can see one another. The user's mobile device 102 may be positioned so that the camera 922 can record light signals associated with the signaling device 105. For example, the user's mobile device 102 may be held up and turned so that the camera 922 can detect imagery of the signaling device 105.

In an embodiment, the signaling device 105 may be carried by a third-party. For example, the signaling device 105 may be a smartphone carried by a restaurant patron. Alternatively, the signaling device 105 may be a device connected to and/or associated with an installation. For example, the signaling device 105 may be a device installed within a building, such as a mounted monitor or television. As an illustrative example (not shown), the signaling device 105 may contain a strobe light and be located within a nightclub.

The signaling device 105 may emit light signals that may be detected by the camera 922. In various embodiments, the signaling device 105 may emit light and/or sound signals on an attached display unit (e.g., display of a smartphone, viewing plane of a television, exposed light bulb, LED indicators, etc.). For example, a smartphone signaling device 105 may play a movie file (e.g., mpeg) on its touchscreen display or may flash a sequence of bright lights using an attached light unit (e.g., a smartphone camera flash). In various embodiments, the light signals emitted by the signaling device 105 may include modulating, flashing, and/or changing sequences of light 202 (e.g., visible Morse code), sequences of colors 204 (e.g., blue, red, yellow, etc.), and/or sequences of patterns 206 (e.g., cross-thatched lines, horizontal lines, vertical lines, angled lines, etc.). Such sequences may include individual flashes, colors, and/or patterns that are represented within the light signals in different durations, intensities, frequencies, or other rendered characteristics. For example, the sequences of flashing light 202 may include a certain number of long flashes to represent different signaling information than if the sequences of flashing light 202 included short flashes. In other words, sequences may include particular flashes, colors, and/or patterns that are included within the sequences to convey different or augmented signaling information.

The user's mobile device 102 may detect the emitted light and/or sound signals when the display unit of the signaling device 105 is within sight, detectable, or otherwise viewable by the user's mobile device 102. The detected light signals may be processed as described below with reference to FIG. 2B. For example, the user's mobile device 102 may detect and decode a sequence of light 202, determine a SIP URI within the decoded information, and transmit a message to a server 110 related to the SIP URI over the network 115 via a wireless data link 130. In an embodiment, the user's mobile device 102 may execute an application (or "app") that may receive and decode detected light signals from the camera 922 and may initiate the transmission of messages via the wireless data link 130 based on the decoded information.

Figure 2B:
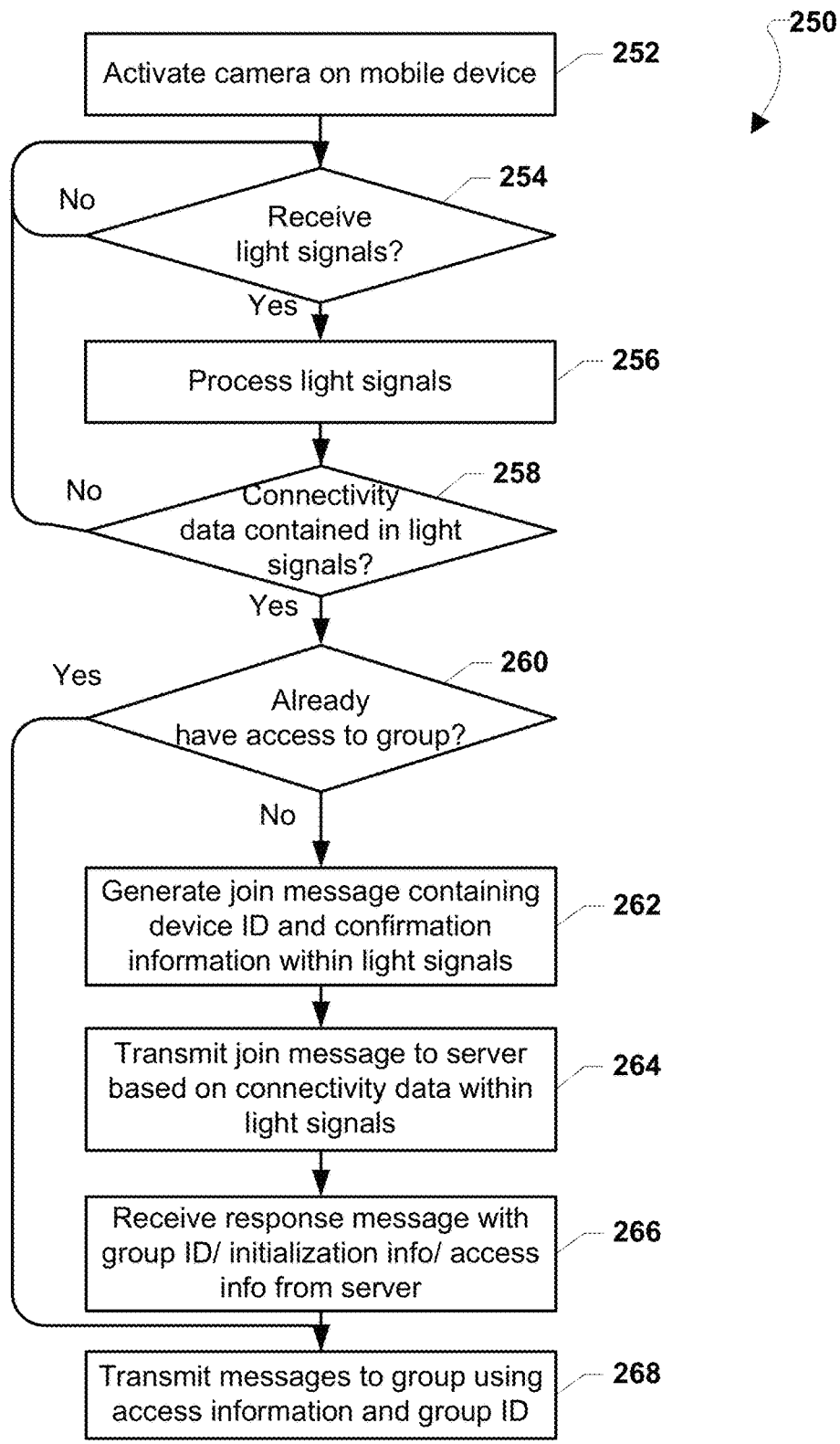
FIG. 2B is a process flow diagram illustrating an embodiment method for a mobile device joining a communication group based on received light signals from a third-party mobile device.

FIG. 2B is a process flow diagram illustrating an embodiment method 250 for a mobile device joining a communication group based on received light signals from a signaling device. As described above, when within a line of sight or positioned within view of a signaling device, a user's mobile device may detect and process (or decode) light signals emitted by the signaling device. Based on the processed light signals, the mobile device may determine group contact information and may transmit messages, create memberships, and otherwise communicate with the communication group. For example, based on received strobe light signals while in a dance club, the mobile device may join and contribute to a Twitter feed for all dancers within the dance club.

In block 252, the mobile device may activate a camera within or connected to the mobile device. In various embodiments, the camera (or other light sensor) may be active whenever the mobile device is powered, when a certain app is executing on the mobile device (e.g., an app that automatically processes light and/or sound signals for creating communication groups), or alternatively, when the user provides input commands (e.g., button presses on a smartphone mobile device). When active, the camera may constantly monitor for and receive light signals. In another embodiment, the camera may periodically become activated and monitor for light signals. For example, every few seconds, the camera may activate and monitor for imagery.

In determination block 254, the mobile device may determine whether light signals are received via the camera. The mobile device may evaluate data transmitted from the camera (or camera data) and determine whether the camera data represents light signals capable of being processed (i.e., valid or useable light signals). For example, camera data that is null or representing blank imagery may not be valid light signals. In an embodiment, the mobile device may compare camera data to a tolerance threshold that indicates valid or useable light signals, and when the camera data exceeds the threshold, the mobile device may determine whether light signals have been received. For example, if the camera data represents imagery that is too dim, dark, or muddled to be evaluated properly, the mobile device may determine the camera data to not include light signals. If the mobile device does not receive light signals (i.e., determination block 254="No"), the mobile device may continue to execute the operations in determination block 254.

However, if the mobile device receives light signals (i.e., determination block 254="Yes"), in block 256 the mobile device may process the received light signals to determine whether it includes any connectivity data. For example, the mobile device may evaluate the received light signals and detect a sequence of flashing lights (e.g., signaling information) that can be decoded into a SIP URI. The processing of light signals is described in detail below with reference to FIG. 2C.

Based on the processing operations in block 256, in determination block 258 the mobile device may determine whether the received light signals contains connectivity data. For example, connectivity data may be an IP address to a server, LAN, or other digital site that is affiliated with an association. As another example, the connectivity data may be a URL (e.g., a website address) or email address related to a particular interest or affinity group.

In an embodiment, connectivity data may also include password or secret key information required to access the group. For example, the connectivity data may describe a secure website associated with a nightclub that can only be accessed with the password provided within light signals emitted by strobe lights within the nightclub. Further, the password or access information within the light signals may be valid for a specific period of time and may be alternated on a regular basis to maintain a low-level of exclusivity to the group. Regarding the above-mentioned nightclub example, the password to the nightclub website may be valid only during the hours of operation of the nightclub and may be changed each day, thereby providing the group of patrons the opportunity to access the website only during periods in which they attend the nightclub.

Returning to FIG. 2B, if the processed light signals does not contain connectivity data (i.e., determination block 258="No"), the mobile device may continue with the operations in determination block 254. In an embodiment, the mobile device may disregard the light signals, or alternatively, may continue to collect additional light signals for appending to previously received light signals. For example, if the mobile device initially processes an incomplete sequence of light signals, connectivity data may only be detected when subsequently received light signals is combined and evaluated with the previously received light signals.

If the processed light signals contains connectivity data (i.e., determination block 258="Yes"), in determination block 260 the mobile device may determine whether the user of the mobile device already has access to the group indicated by the connectivity data. The mobile device may compare the connectivity data to a stored list of groups with which the user is associated. For example, the mobile device may maintain a database of website addresses, group names, codes, IP addresses, etc. that relate to groups to which the user has previously gained access. If there is a match between the connectivity data within the light signals and such stored information, the mobile device may determine the user already has access. For example, the user may have previously registered with a Twitter feed for a social club described within received light signals and therefore may already have access to the group.

If the user already has access (i.e., determination block 260="Yes"), in block 268 the mobile device may transmit messages to the group described by the connectivity data, such as by using access information and group identifiers associated with the group. For example, the mobile device may report GPS coordinates to a group Twitter feed, transmit messages for posting on a group message board, upload video files to a group YouTube channel, etc.

However, if the user does not already has access to the communication group described in the connectivity data of the light signals (i.e., determination block 260="No"), in block 262 the mobile device may generate a message for joining the communication group. The join message may include the mobile device identification, user identification information, and/or any password, confirmation, or access information detected within the light signals. Based on the group type or other specifics within the connectivity data, the join message may be a communication that utilizes particular formatting, function calls, or encoding that may be utilized by the communication group. For example, the communication group indicated by the connectivity data may be a Facebook group and the join message may be a communication that includes API calls configured to interface with Facebook software and infrastructure. In various embodiments, the join message may include header information or other metadata that may be received and utilized by a server or devices maintaining the communication group. For example, the join message may contain header information indicating that the communication regards a new user to the communication group.

In block 264, the mobile device may transmit the join message to a server (e.g., a remote server, a local server associated with the communication group, etc.) based on the connectivity data within the received light signals, such as by using contact information described within the connectivity data. For example, the join message may be transmitted to an email address detected within the connectivity data.

In block 266, the mobile device may receive a response message from the server maintaining the communication group in response to the transmitted join message, such as a message with group identifier, initialization, and/or access information. The response message may contain data indicating formats, regulations, or other information the mobile device may utilize in performing subsequent communications related to the communication group. For example, the response message may contain a code or special key that all communications to the group by the mobile device must contain (e.g., each message to be posted to the group's common message board must include an access code). In an embodiment, the response message may include registration information, access identification information, or other data that the mobile device may store and employ for future communications with the communication group or the server. In an embodiment, the mobile device may store the connectivity data, access information, registration details, and any other pertinent information related to the communication group within a database as described above.

In block 268, the mobile device may transmit a message to the communication group and may include the access information, user identification, and/or special formatting as required by the server.

In an embodiment, the mobile device may not be required to join the communication group by sending a join message, logging in, providing a password, or performing any other action prior to contributing to the communication group. For example, the communication group may be an open-access website that permits users to post messages or other content for display to other users.

Figure 2C:
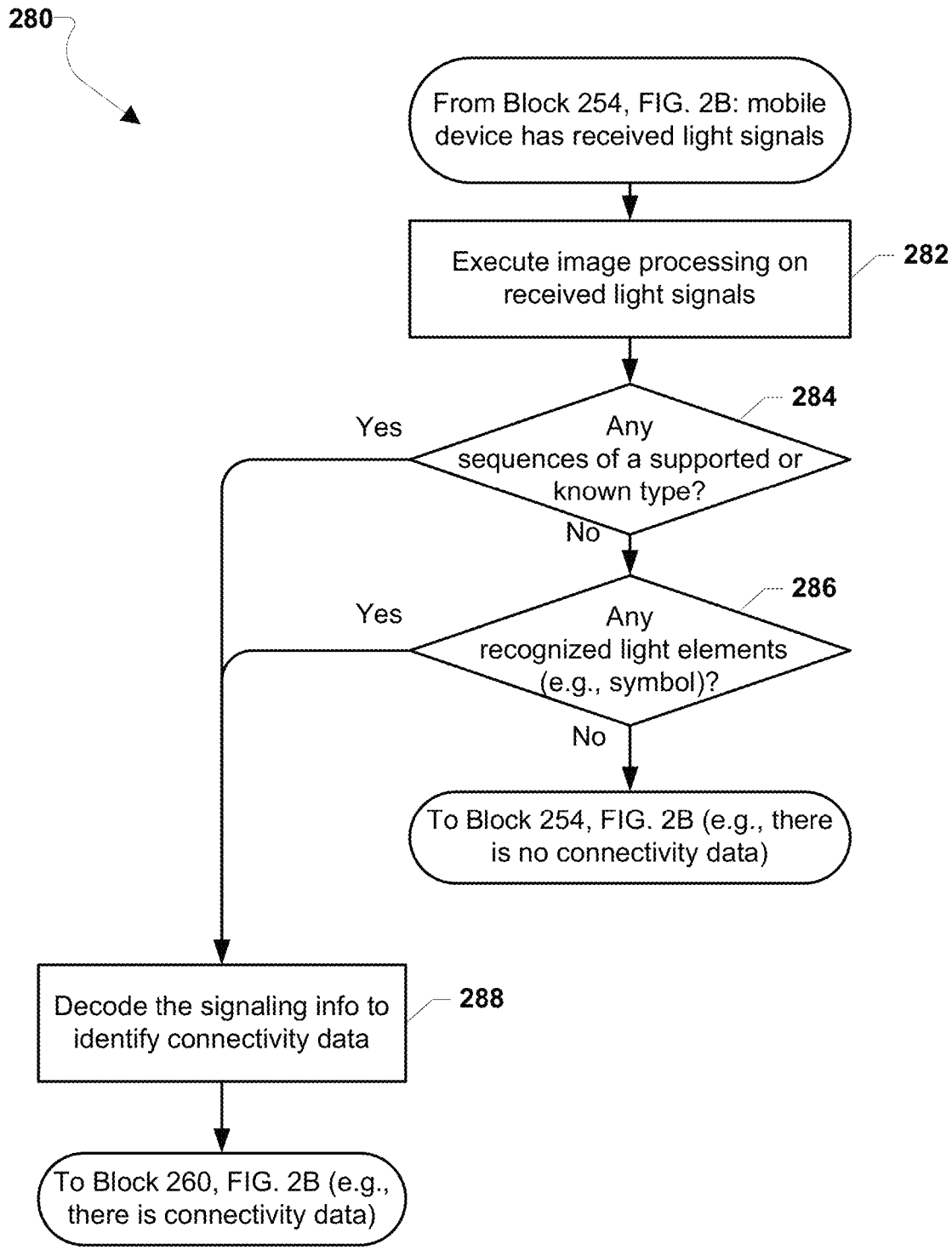
FIG. 2C is a process flow diagram illustrating an embodiment method for a mobile device processing light signals.

FIG. 2C illustrates an embodiment method 280 for a mobile device processing light signals. As described above, received light and/or sound signals may contain signaling information that may be decoded and used by a user's mobile device to contact and communicate with a communication group, such as a website, social media collective, or other association. To transmit communications to the communication group, such as delivering email to a listserv, the communication group connectivity data must be determined from signaling information within the light signals. The mobile device may perform the operations of the method 280 to evaluate received light signals and detect signaling information that may describe contact information, descriptive content, and access information required for the user to join the communication group. In an embodiment, the operations of the method 280 may be performed by the mobile device in place of the operations of block 256 and determination block 258 and may be performed by the mobile device when light signals is received (i.e., FIG. 2B determination block 254="Yes").

In block 282, the mobile device may execute image processing operations on received light signals. In an embodiment, the light signals may be represented within individual images or a series of images collected by a camera connected to the mobile device, as described above with reference to FIG. 2B. The mobile device may examine each frame or image within the light signals to detect changes in imagery. For example, the image processing may compare coloring, lighting, and/or pixel values of images from one time period to another to determine any changes that may correspond to movement or modulation within the light signals. Additionally, the image processing may detect distinct light elements, objects, or artifacts within the light signals. For example, by detecting contrast variances within the imagery of the light signals, the mobile device may detect human features (e.g., face, nose, hair length, etc.), aspects on clothing (e.g., patches, badges, logos, etc.), and symbols, such as universal product codes (UPC) or a quick response (QR) codes. As another example, the mobile device may also detect individual light sources from within the imagery, such as a camera flash bulb, a lamp, a strobe light, or any other object configured to emit contrasting lights or colors. In various embodiments, light color/sequence/pattern elements may include elements in light signals that are detectable by machines (e.g., a camera within the mobile device) and that may or may not be perceptible to the human eye.

In an embodiment, the image processing operations may detect distinct light color/sequence/pattern elements to which the mobile device may respond or recognize. For example, the image processing may detect particular colors that correspond to a predefined signaling language or technique of signaling. As another example, the mobile device may evaluate the light signals to detect certain shapes (e.g., circles), textures (e.g., crosshatching, lines, polka-dots, etc.), and/or formations within the imagery.

Based on the image processing operations, in determination block 284, the mobile device may determine whether the light signals contain any sequences of a predefined, supported, or known type of signaling information. For example, the mobile device may determine whether there is a sequence of flashing or modulating lights, a sequence of colors, and/or a sequence of patterns that is defined in a signaling language stored and/or accessible by the mobile device. The mobile device may compare any color/sequence/pattern elements detected within the light signals to predefined signaling sequences or patterns within the signaling language and determine whether there are any matches. For example, the mobile device may compare detected flashing in the light signals to patterns stored within the signaling language database of recognized flashing signaling techniques. The mobile device may evaluate the entirety or only portions of the light signals to determine whether predefined (or known) signaling sequences, and therefore signaling information, are within the light signals. In various embodiments, sequences of flashing lights, patterns, and/or colors may include or be augmented by flashing lights, patterns, and/or colors of varying duration, varying frequency, and/or varying intensity (or brightness). For example, similar to Morse code, a sequence of flashing lights may include individual instances of short flashes (e.g., a millisecond, etc.) and/or long flashes (e.g., a half-second, etc.) that may indicate different codes, words, or other information when decoded by the mobile device. In other words, sequences may include color/sequence/pattern elements that vary in duration, frequency, speed, and intensity/brightness.

If there are no supported or known signaling information sequences (i.e., determination block 284="No"), in determination block 286 the mobile device may determine whether the light signals contains any light color/sequence/pattern elements, such as symbols, visuals, or imagery, relating to predefined signaling information. For example, the mobile device may compare distinct color/sequence/pattern elements detected during the image processing operations to data within the signaling language database defining predefined (or recognized) types of symbols. As another example, imagery that is similar to the structure of a QR code may be determined to correspond to signaling information. If the light signals does not contain a light color/sequence/pattern element (e.g., a symbol or visual) that matches any predefined signaling information within the signaling language (i.e., determination block 286="No"), the mobile device may determine that the light signals does not contain any signaling information and therefore does not include any connectivity data that may be used to connect the user to a communication group. The mobile device may continue with the operations in determination block 254 of FIG. 2B.

However, if the light signals contains a light color/sequence/pattern element (e.g., a symbol or visual) that matches signaling information within the signaling language (i.e., determination block 286="Yes") or if there are sequences that match signaling information within the signaling language (i.e., determination block 284="Yes"), the mobile device may determine that the light signals contains recognized signaling information that may be utilized by the mobile device. In block 288, the mobile device may decode the signaling information within the light signals to identify connectivity data, such as a URL or a SIP URI. In an embodiment, the mobile device may use stored keys, ciphers, guidelines, or data patterns related to the signaling language to decode the signaling information and detect connectivity data. For example, the mobile device may pattern-match received light signals to predefined color sequences in the signaling language database and determine corresponding words, numbers, data, and/or software instructions of the matches.

Figure 3A:
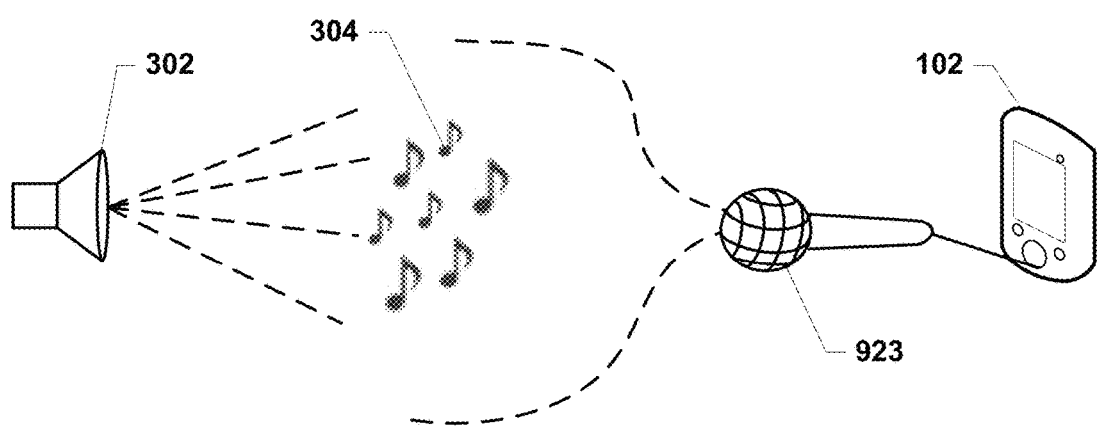
FIG. 3A is a diagram illustrating a mobile device receiving sound signals with a microphone.

FIG. 3A illustrates a diagram of a mobile device 102 receiving sound signals 304 with a microphone 923. Similar to as described above with reference to FIG. 2A, when within a certain proximity, the microphone 923 connected to the mobile device 102 may detect and receive sound signals 304 emitted by a nearby signaling device 302, such as a loudspeaker unit within an installation. For example, the mobile device 102 may receive musical note sequences emitted by a nightclub's signaling device 302 while within the nightclub.

In an embodiment, the microphone 923 may be external to the mobile device 102, or alternatively, embedded within the housing of the mobile device 102. Additionally, the microphone 923 may be connected to the mobile device 102 via any wired or wireless connection link, such as an audio-visual cable, short-range radio transmissions (e.g., Bluetooth, Zigbee, etc.), or in the case of an internal microphone 923, may be directly connected with various circuitry to the processor and/or memory of the mobile device 102.

In an embodiment, the mobile device 102 may buffer, store, and/or process received sound signals 304 at the time of receipt by the microphone 923. For example, the mobile device 102 may execute software routines that filter, clarify, and otherwise convert received sound signals 304 into data useable by the mobile device 102. In another embodiment, the microphone 923 may be configured to detect ultrasonic (or ultrasound) sound signals. For example, the microphone 923 may detect and process sounds that are of a frequency undetectable by the human ear.

In various embodiments, the signaling device 302 may be another mobile device, or any other device connected to a speaker and configured to emit sound signals 304. For example, the signaling device 302 may be a smartphone carried by a nightclub employee, proprietor, or patron, a television in a store emitting audio through its speakers, or a loudspeaker within a sports stadium. The signaling device 302 may emit sound signals 304 in the form of musical notes, beeps, tones, and other sounds as described above. For example, the signaling device 302 may emit audio based on a sound file (e.g., .wav, .mp3, .m4a, etc.) that may be stored on the signaling device 302 or within a connected media.

The user's mobile device 102 may detect and process the sound signals 304 when the mobile device 102 is within a distance close enough such that the sound waves produced as the signaling device 302 emits the sound signals 304 may be received by the microphone 923. The detected sound signals 304 may be processed as described below with reference to FIG. 3B. For example, the user's mobile device 102 may detect and decode a tonal sequence, determine a SIP URI within the decoded information, and transmit a message based on the SIP URI that enables the user to join a group communication. In an embodiment, the user's mobile device 102 may execute an application (or "app") that may receive and decode detected sound signals from the microphone 923 and may initiate the transmission of messages that may request entry into a group communication, such as a social media website group, listserv, or online chat group.

In an embodiment, the mobile device 102 may use the microphone 923 in combination with a camera, as described above, and the mobile device 102 may process sound signals associated with corresponding light signals. For example, the mobile device 102 may utilize its camera and microphone 923 to receive video conversation data which may be processed for light signals and/or sound signals.

Figure 3B:
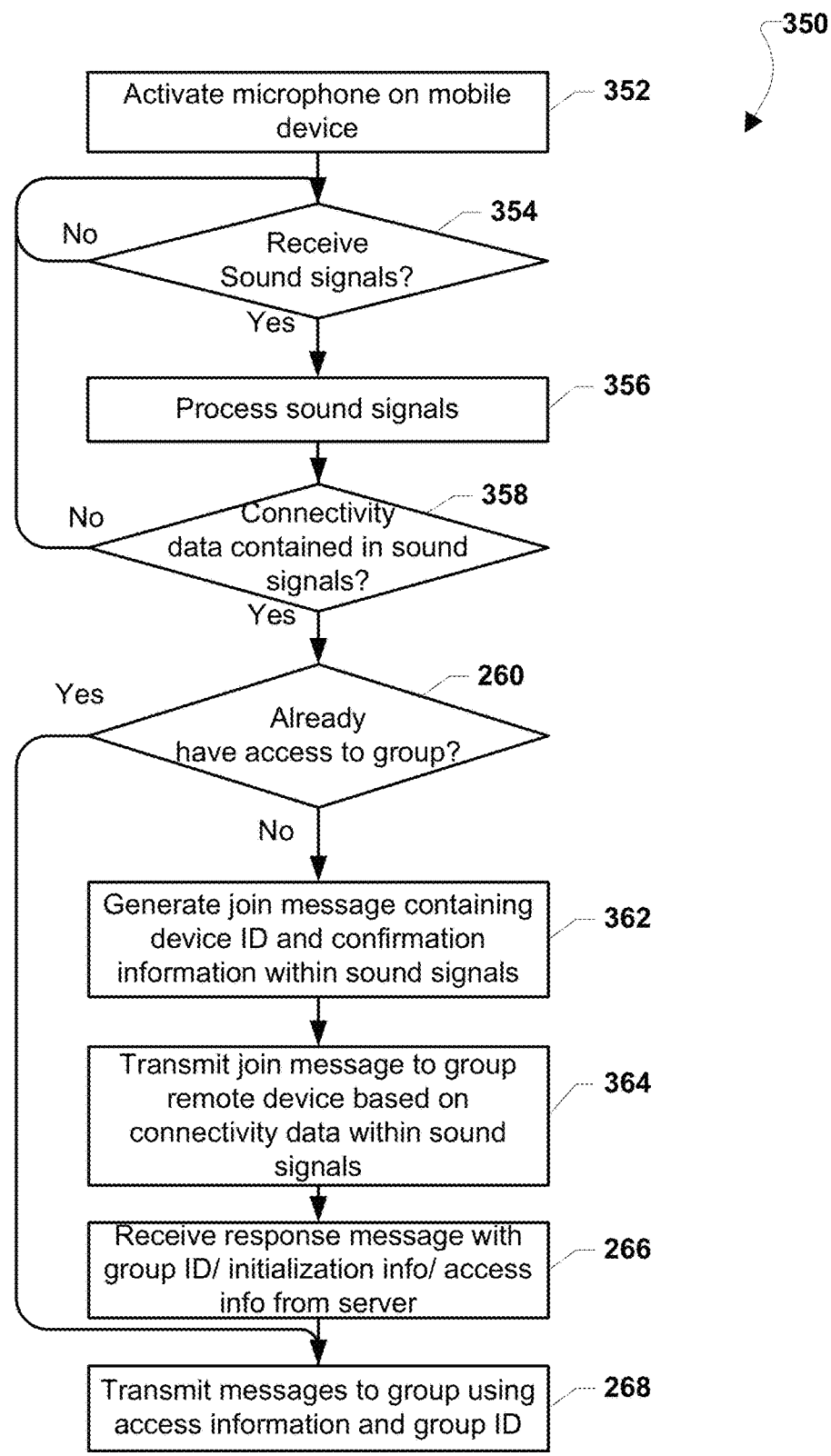
FIG. 3B is a process flow diagram illustrating an embodiment method for a mobile device joining a communication group based on received sound signals from a third-party mobile device.

FIG. 3B illustrates an embodiment method 350 for a mobile device joining a communication group based on received sound signals from a signaling device. Similar to the method 250 described above with reference to FIG. 2B, the method 350 enables the mobile device to become associated with the communication group, such as a Facebook group, or gain access to a meeting forum for the communication group, such as a particular IP address, based on signaling information within received sound signals. When in an environment, such as a nightclub, the mobile device may be within proximity of a signaling device emitting sound signals containing signaling information that describes instructions, directions, contact information, etc. for joining the communication group.

In block 352, the mobile device may activate a microphone housed within or connected to the mobile device. In various embodiments, the microphone may be active whenever the mobile device is powered, when a certain app is executing on the mobile device (e.g., an app that automatically processes light and/or sound signals for creating communication groups), or alternatively, when the user provides input commands (e.g., button presses on a smartphone mobile device). When active, the microphone may constantly monitor for and receive sound signals. In another embodiment, the microphone may periodically become activated and monitor for sound signals. For example, every few seconds, the microphone may activate and monitor for sounds.

In determination block 354, the mobile device may determine whether sound signals are received via the microphone. The mobile device may evaluate data transmitted from the microphone (or microphone data) and determine whether the microphone data represents sound signals capable of being processed (i.e., valid sound signals). For example, microphone data that is null or representing blank audio data may not be valid sound signals. In an embodiment, the mobile device may compare microphone data to a tolerance threshold that indicates valid or useable sound signals, and when the microphone data exceeds the threshold, the mobile device may determine whether sound signals have been received. For example, if the microphone data represents audio that is too low in volume, too low in pitch, distorted, and/or muddled to be evaluated properly, the mobile device may determine the microphone data to not include sound signals. If the mobile device does not receive sound signals (i.e., determination block 354="No"), the mobile device may continue to execute the operations in determination block 354.

However, if the mobile device receives sound signals (i.e., determination block 354="Yes"), in block 356 the mobile device may process the received sound signals to determine whether it includes any connectivity data. In other words, the mobile device may analyze the sound signals to determine whether they contain signaling information describing a communication group. For example, the mobile device may evaluate the received sound signals and detect a sequence of audio tones that matches signaling information within a predefined signaling language that can be decoded into a SIP URI. And embodiment method for processing of sound signals is described in detail below with reference to FIG. 3C.

The operations in blocks 358, 260, 362-364, 266-268 may be similar to the operations described above with reference to blocks 258-268 in FIG. 2B, with the exception that the operations in blocks 358, 362, 364 may utilize information (e.g., connectivity data, group identifiers, etc.) obtained from sound signals instead of light signals. Based on the processing operations in block 356, in determination block 358 the mobile device may determine whether the received sound signals contains connectivity data. As described above, connectivity data may be any data or information that describes the identity, characteristics, type, and/or contact information of a group, collective, union, etc. such that the mobile device may communicate with members of the group. If the processed sound signals does not contain connectivity data (i.e., determination block 358="No"), the mobile device may continue with the operations in determination block 354. In an embodiment, the mobile device may disregard the sound signals, or alternatively, may continue to collect additional sound signals for appending to previously received sound signals.

If the processed sound signals contains connectivity data (i.e., determination block 358="Yes"), in determination block 260 the mobile device may determine whether the user of the mobile device already has access to the communication group described by the connectivity data, as is described above. If the user already has access (i.e., determination block 260="Yes"), in block 268 the mobile device may transmit messages to the communication group indicated by the connectivity data, such as by using access information and group identifiers associated with the group.

However, if the user does not already has access to the communication group indicated in the connectivity data of the sound signals (i.e., determination block 260="No"), in block 362 the mobile device may generate a message for joining the communication group, such as a message including a mobile device identifier and confirmation information from the sound signals. In block 364, the mobile device may transmit the join message to a server based on the connectivity data within the received sound signals, such as by using contact information described within the connectivity data, and in block 266, the mobile device may receive a response message from the server maintaining the communication group in response to the transmitted join message, such as a message with group identifier, initialization, and/or access information. In block 268, the mobile device may transmit message to the communication group and may include the access information, user identification, and/or special formatting as required by the server.

Figure 3C:
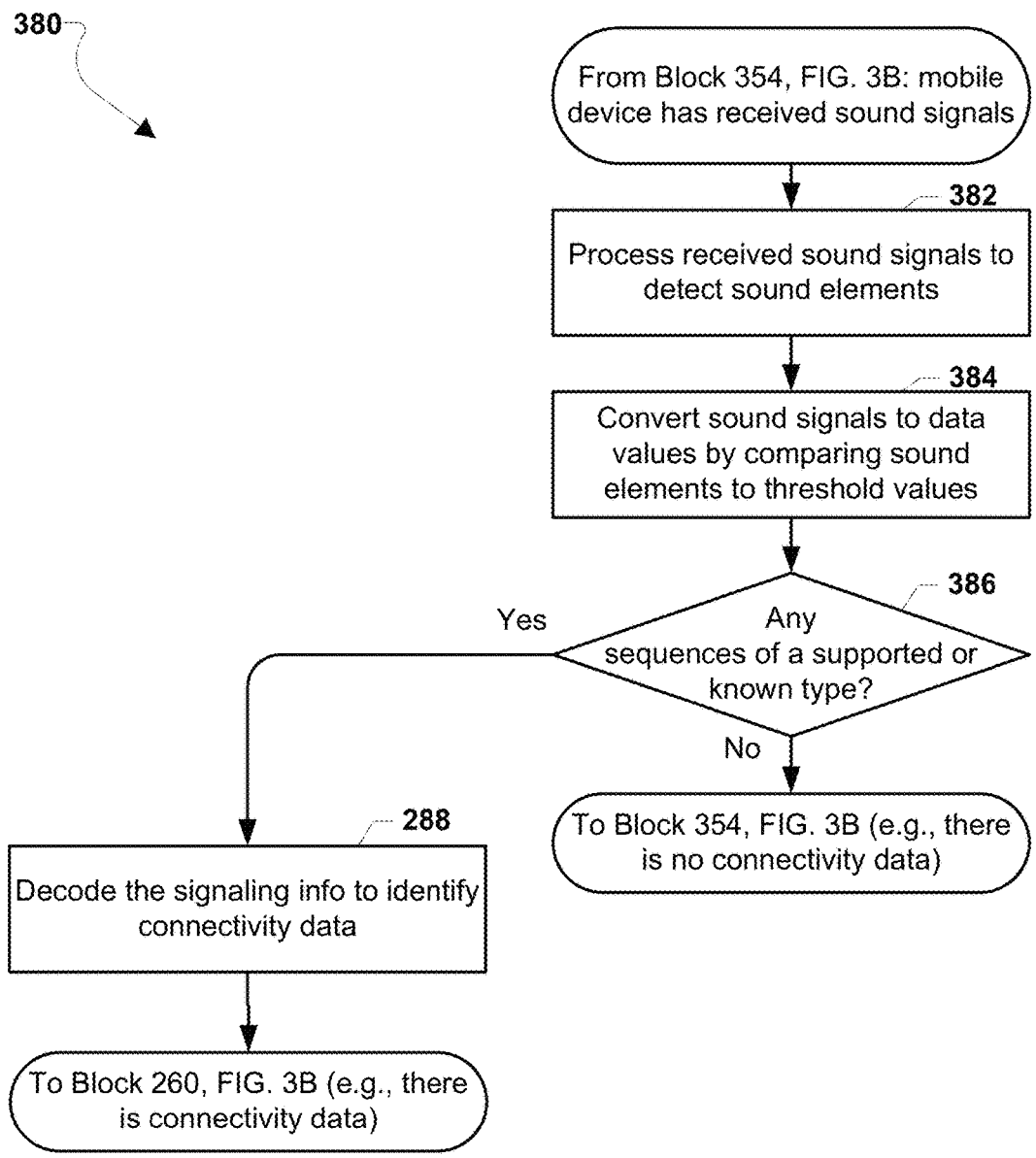
FIG. 3C is a process flow diagram illustrating an embodiment method for a mobile device processing sound signals.

FIG. 3C illustrates an embodiment method 380 for a mobile device processing sound signals. Similar to the method 280 described above with reference to FIG. 2C, the method 380 may be performed by the mobile device once a microphone has received valid sound signals (e.g., audio that is not disrupted, blank, etc.). In general, the mobile device may compare sound signals to predefined patterns, such as within a common signaling language, to determine whether signaling information and connectivity data has been received.

In block 382, the mobile device may process the sound signals to detect individual or distinct sound elements. In other words, the mobile device may perform audio processing routines. Sound signals may include audio from numerous sources. For example, when recording sound signals in a crowded public area, the mobile device may receive sound signals from multiple sources simultaneously. The sound signals may be processed to identify distinctive sound elements, such as musical tones, or sequences of sounds which may correspond to similar sources. For example, the processing may identify musical tones as well as clicking sounds in the sound signals. Sequences within sound signals may include sound elements of varying frequency (or tempos), varying volume, varying pitch, and varying duration. In an embodiment, sequences within sound signals may include sound elements associated with varying instruments (e.g., a trombone, a timpani, a clarinet, etc.).

Sound elements and light elements from sound and light signals may be used in combination to encode information, augmenting the pace and granularity in which signaling information or other data can be transferred. Accordingly, in an embodiment, the mobile device may also detect light elements within light signals that may augment the sound elements recognized within the sound signals. Such light elements within light signals may be received contemporaneously with the received sound signals. For example, the mobile device may process received sound signals and light signals to detect sound and light elements that may be combined to represent particular signaling information. As a non-limiting illustration: the mobile device may detect a flashing light that has a certain duration (e.g., two seconds, etc.) as well as a low-pitched tone, the combination of both may represent a first message. Similarly, the mobile device may detect another flashing light of the same certain duration (e.g., two seconds, etc.) along with a high-pitched tone, the combination of both may represent a second, different message. In this way, elements within light signals may augment information within sound signals, and vice versa.

Sound elements in the sound signals may belong to a similar source, such as a signaling device, when they share particular characteristics, such as a similar volume level, distortion properties, and/or synthesizer settings. For example, a single source, such as an individual speaker, may generate multiple sound elements that all employ saw tooth waves. As another example, the processing may detect all sounds within the sound signals that are emitted from a nearby smartphone based on the volume level and clarity. In an embodiment, the processing may generate a list of all distinct sources of sounds within the sound signals, and may segregate the sound elements associated with the various sources. For example, the mobile device may determine the sounds associated with each smartphone, human voice, ambient noise, and speaker system represented in the sound signals. In another embodiment, the mobile device may disregard all identified sound elements that are not mechanically generated. For example, human voices may be ignored by the mobile device, as no signaling information would likely be contained within sound signals related to the human voices.

Figure 3D:
FIG. 3D is a diagram of example data generated by processing sound signals with a threshold mechanism.

In block 384, the mobile device may compare the individual sound elements within the sound signals to threshold values in order to convert the sound signals to normalized or simplified data values. Based on whether individual sound elements are within a certain tolerance of the threshold values, the mobile device may convert sound elements to binary data values, such as 0 or 1. For example, the mobile device may convert a sequence of musical notes to a binary data pattern. FIG. 3D illustrates an example threshold value conversion.

In determination block 386, similar to the operations in determination blocks 284-286 as described above with reference to FIG. 2C, the mobile device may evaluate the converted sound signals (or data values) to determine whether there is signaling information (or any sequences of a supported or known type). For example, the mobile device may perform pattern-matching operations in which predefined sequences or patterns of a signaling language are compared to the converted sound elements. In an embodiment, the mobile device may use both the data values of the converted sound elements and timing information related to the sound signals to detect signaling information. For example, certain patterns of converted sound elements may match different stored patterns of the signaling language dependent upon the duration (e.g., length of audio sample) of the sound signals from which they were generated. As another example, the mobile device may determine that a sequence of binary values occurring over a first length of time matches particular information within the signaling language, whereas the same sequences of binary value over a second length of time matches different signaling information. In other words, the mobile device may utilize tempo or the speed of emitting to identify the received sound signals as signaling information. If there are no known signaling information sequences (i.e., determination block 386="No"), the mobile device may continue with the operations in determination block 354 described above with reference to FIG. 3B.

However, if there is signaling information in the converted sound signals (i.e., determination block 386="Yes), in block 288, the mobile device may decode the signaling information to identify connectivity data, such as a URL or a SIP URI.

FIG. 3D illustrates a diagram of example signaling information 392 generated by processing sound elements with a mobile device. As described above, communicating signaling information 392 may be accomplished by a signaling device by emitting sound signals 304 in particular patterns or sequences. For example, a signaling device may emit audible tones in varying frequencies over a certain period of time that corresponds to an encoded message, such as a URL or IP address corresponding to a communication channel for a communication group.

As referenced above with respect to FIG. 3C, in an embodiment, the mobile device may execute a basic conversion operation to determine signaling information 392 from the received sound signals 304. Once a sequence of tones, such as musical notes, is distinguished from received sound signals 304, the mobile device may determine the frequency or pitch of each tone in the sequence. For example, the mobile device may determine that a certain tone represents a musical "middle C". In an embodiment, each pitch may correspond to a particular frequency value (e.g., measured in Hz) and/or sound wavelength (e.g., measured in centimeters) value that is stored within a data table within the mobile device.

The mobile device may compare the determined frequency or pitch to threshold values to determine a binary value for the tone. If the determined frequency of the tone is above or below the threshold value, the tone may be converted to (or represent) a certain binary value. For example, every tone above a certain frequency may be a 0 and every tone below may be a 1, or vice versa. The mobile device may convert all tones within a sequence into such binary values to generate the signaling information 392. With the binary values, the mobile device may evaluate the signaling information 392, determine matches with sequences within a predefined signaling language, and identify connectivity data described above with reference to FIG. 3C.

In various embodiments, the conversion operations may include more complex evaluations of the received sound signals 304. For example, the mobile device may evaluate tonal sequences and detect particular tonal arrangements or sequences, such as chords, harmonies, fifths, and other musical structures. With more complex arrangements of tones within the sound signals, the mobile device may identify more complex formatting of signaling information 392, such as hexidecimal encodings.

Figure 4:
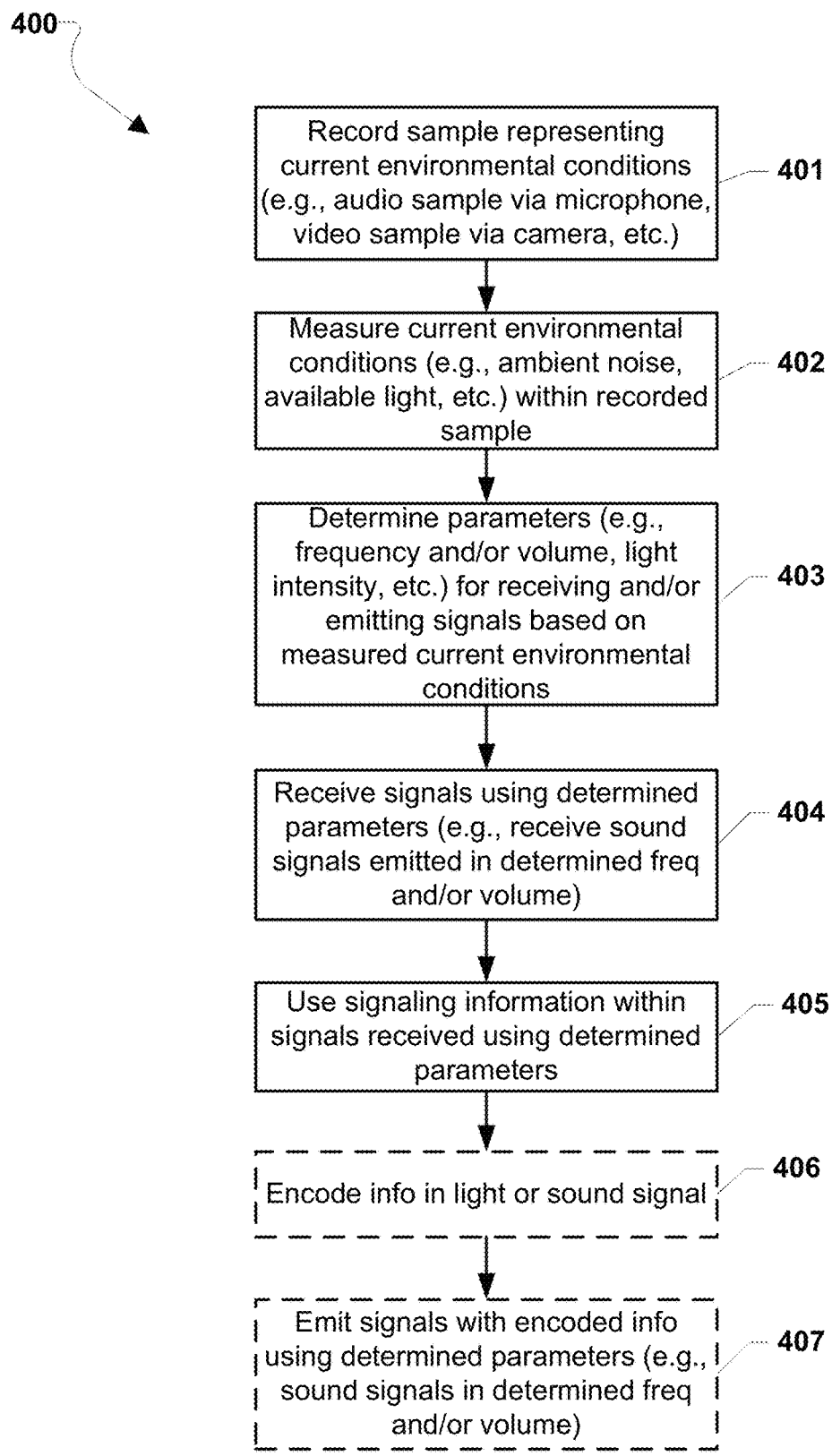
FIG. 4 is a process flow diagram illustrating an embodiment method for a mobile device to determine parameters for receiving and/or transmitting signals based on current ambient conditions.

FIG. 4 illustrates an embodiment method 400 for a mobile device to adjust the transmission of light and/or sound signals based on current ambient conditions. As described above, mobile devices configured to utilize signaling information for communicating with other mobile devices and/or signaling devices may be used within various environments whose ambient conditions could interfere with light or sound signals. For example, a mobile device configured to receive and transmit sound signals controlling, pinging, or otherwise establishing a communication channel with other devices may have difficulty communicating such signals in the loud ambient conditions of a night club. As another example, when in a room that is illuminated with bright white lights, light signals from the mobile device may not be easily distinguished from the ambient illumination. To recognize and overcome such challenges, the mobile device may be configured to perform the operations of the method 400 to change parameters and/or the content of light and/or sound signals to compensate for ambient conditions. In various embodiments, the method 400 may be performed by mobile devices and/or dedicated signaling devices executing software for processing signals and signaling information.

In block 401, the mobile device may record a sample of data from a light sensor and/or microphone to determine current ambient conditions. For example, using a microphone, the mobile device may record a brief audio sample. As another example, using a camera, the mobile device may measure the ambient light or video sample. Such a sample may be of a predefined length known to be of adequate length for use in determining conditions in the current environment. For example, a recorded sound sample may be a few milliseconds, seconds, etc. such that ambient noise may be properly gauged. In various embodiments, the length of the recorded sample may be determined based on predetermined parameters, such as settings stored within the mobile device, current location information of the mobile device, previous sample lengths, etc.

In block 402, the mobile device may measure current ambient conditions within the recorded sample. Such ambient conditions may include ambient noise and ambient light. For example, the mobile device may measure the average decibel level for all ambient noise within the recorded sound sample. As another example, the mobile device may measure the average luminosity, contrast, or other metric of ambient light in a recorded video sample.

In block 403, the mobile device may determine parameters for receiving and/or emitting signals (e.g., light and/or sound signals) based on the measured current ambient light and/or sound conditions. The parameters may include the intensity (or brightness) of light signals, color of light signals, volume level of sound signals, frequency for transmitting sound signals, and pitch of sound signals. The mobile device may use the determined parameters (or determined parameter values) to calibrate, configure, and inform monitoring operations for receiving incoming signals from other devices, such as signaling devices. The mobile device may also use the determined parameters when emitting signals. For example, a mobile device configured to emit light signals may determine that light signals should be emitted at a higher power or intensity level in order to make the emitted light stronger easier for another device to detect with a camera in a bright room. As another example, a mobile device configured to emit sound signals may determine that a certain signal frequency should be used when there is too much ambient noise in other frequency ranges.

In an embodiment, the mobile device may compare the measured conditions to predefined thresholds to determine whether to change current communication parameters (e.g., volume, brightness, frequency, signaling protocol, etc.). For example, the mobile device may compare a measured average ambient noise value to minimum and maximum acceptable noise values associated with a particular transmission frequency, and when the current ambient noise is above or below these threshold values, the mobile device may adjust communication parameters to transmit and/or receive sound signals at a different frequency. In an embodiment, the mobile device may change the type of signaling based on the measured conditions. For example, when configured to receive and/or emit sound signals, the mobile device may be configured to emit and/or monitor for light signals when the measured ambient noise exceeds a maximum acceptable ambient noise level. As another example, the mobile device may be configured to emit and/or monitor for sound signals when the measured ambient light exceeds a maximum light exposure for effective signaling via light signals (e.g., daylight).

In block 404, the mobile device may receive light and/or sound signals using the determined communication parameters. In particular, the mobile device may monitor for incoming signals from other devices using the determined communication parameters. For example, the mobile device may listen for sound signals corresponding to certain frequencies or pitches based on the determined parameters. As another example, the mobile device may process incoming light signals of a certain color or brightness level based on the determined parameters. In block 405, the mobile device may use signaling information within the signals received using the determined parameters. For example, the mobile device may process the signals received using the determined parameters (e.g., a certain sound frequency) to identify an IP address that may be accessed to join a social group. In various embodiments, the mobile device may use the signaling information for various purposes other than joining groups, such as executing scripts delivered by third-parties, adjusting configurations, and receiving other instructions for execution on a processor.

In various embodiments, the mobile device may be configured to only access and use signaling information from signals conforming to the determined communication parameters, and thus may be enabled to filter signaling information from various received signals. For example, based on the determined parameters, the mobile device may only acknowledge sound signals having the exact pitch or frequency defined by the determined communication parameters. In an embodiment, the determined communication parameters may be used by the mobile device to authenticate signaling information. For example, when the mobile device and other authorized devices are configured to determine or calculate parameters in the same way (e.g., similar equations and/or variables for determining threshold values), the mobile device may ignore signaling from dissimilar, spoofed, or otherwise unauthorized devices.

In optional block 406, the mobile device may encode information in light and/or sound signals, as described above. For example, the mobile device may convert, encode, and otherwise package a command message instructing another recipient device to perform certain operations, or alternatively a message indicating the identity of a group that may be contacted via a URL. In optional block 407, the mobile device may emit signals with the encoded information using the determined communication parameters. For example, the mobile device may emit certain musical samples at a certain volume, frequency, or pitch so that nearby devices with microphones may detect and distinguish the signaling from ambient noise.

Figure 5A:
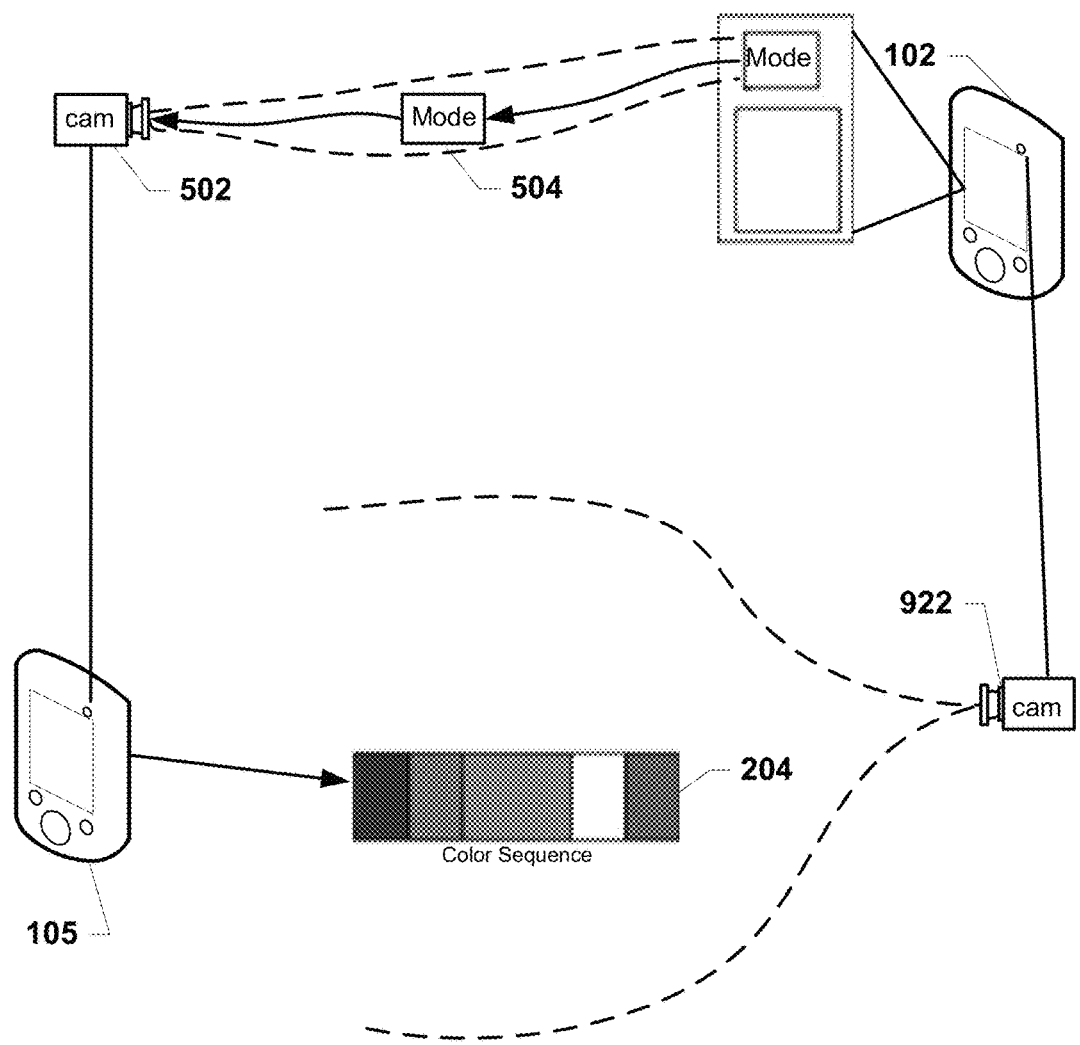
FIG. 5A is a diagram illustrating a mobile device signaling a preferred mode and receiving light and/or sound signals corresponding to the preferred mode.

FIG. 5A illustrates a diagram of a mobile device 102 signaling preferred mode information to a signaling device 105 and receiving light signals including a sequence of colors 204 corresponding to the preferred mode. As described above, the mobile device 102 may be configured to receive and process various types of signals, including sound signals (e.g., music, sounds, etc.) and light signals (e.g., lights, colors, etc.). However, dependent upon the configuration and available equipment of the mobile device 102, all forms of light and/or sound signals may not be received and properly processed. For example, if the mobile device 102 does not contain a microphone, sound signals containing signaling information may not be received and the mobile device 102 may not detect connectivity data enabling the user to join in a related communication group. As another example, the mobile device 102 may be optimized to process light signals, such as flashing lights, and thus may not detect signaling information related to color sequences within light signals.

In an embodiment, the mobile device 102 may have a preferred mode of receiving and processing light and/or sound signals from the signaling device 105. The preferred mode may indicate the formatting, technique, encoding, characteristics, type, or other manner of emitting light and/or sound signals with which the mobile device 102 may receive and process light and/or sound signals. When informed of the preferred mode, the signaling device 105 may emit light and/or sound signals according to the preferred mode information to ensure access to signaling information within the light and/or sound signals. In various embodiments, the preferred method may be a configuration, mode, software instructions, or any other information that the signaling device 105 may receive and configure to emit a particular form of light and/or sound signals to accommodate the mobile device 102. For example, the preferred mode may be a software command for an application executing on the signaling device 105 that configures the signaling device 105 to emit musical sounds. In another embodiment, the preferred mode may additionally include commands for the signaling device 105 to adjust emit or broadcast parameters of the light and/or sound signals. For example, the preferred mode may indicate that sound signals should be played louder, light signals should be brighter, that the frequency of any information should be faster or slower, etc.

In an embodiment, the mobile device 102 device may utilize a technique similar to as described above in FIG. 2A-C, in which light signals 504 are emitted to communicate the preferred mode. However, unlike in FIG. 2A-C, the mobile device 102 may emit the light signals 504 for receipt by a camera 502 within the signaling device 105. In an embodiment, both the mobile device 102 and the signaling device 105 may be smartphones configured to receive and display light signals. Once the light signals 504 are received by the signaling device 105 camera 502, the signaling device 105 may perform operations similar to those described below with reference to FIG. 5C. For example, the signaling device 105 may process received light signals 504, detect signaling information, and decode the signaling information to identify the preferred mode of the mobile device 102. In response to receiving the light signals 504 and determining the preferred mode, the signaling device 105 may emit light signals including sequences of colors 204 that may be received by the camera 922 of the mobile device 102.

In another embodiment, the mobile device 102 may emit the preferred mode message to the signaling device 105 via sound signals. Much like as described above, the mobile device 102 may emit a sequence of tones (e.g., music, pulses, etc.) representing an indication of the preferred mode. Delivery via sound signals may require the signaling device 105 to be configured to receive sound with a microphone. In an embodiment, the preferred mode may indicate that the signaling device 105 should emit light and/or sound signals in a format different than the light and/or sound signals communicating the preferred mode. For example, the mobile device 102 may utilize sound signals (e.g., music tones) to communicate the preferred mode of light signals. In another embodiment, the preferred mode may be communicated by the mobile device 102 to the signaling device using short-range radio broadcasts (e.g., Bluetooth, Bluetooth Low Energy (BTLE), etc.). For example, the mobile device 102 may periodically broadcast BTLE messages indicating that the mobile device 102 is configured to best receive light signals.

Figure 5B:
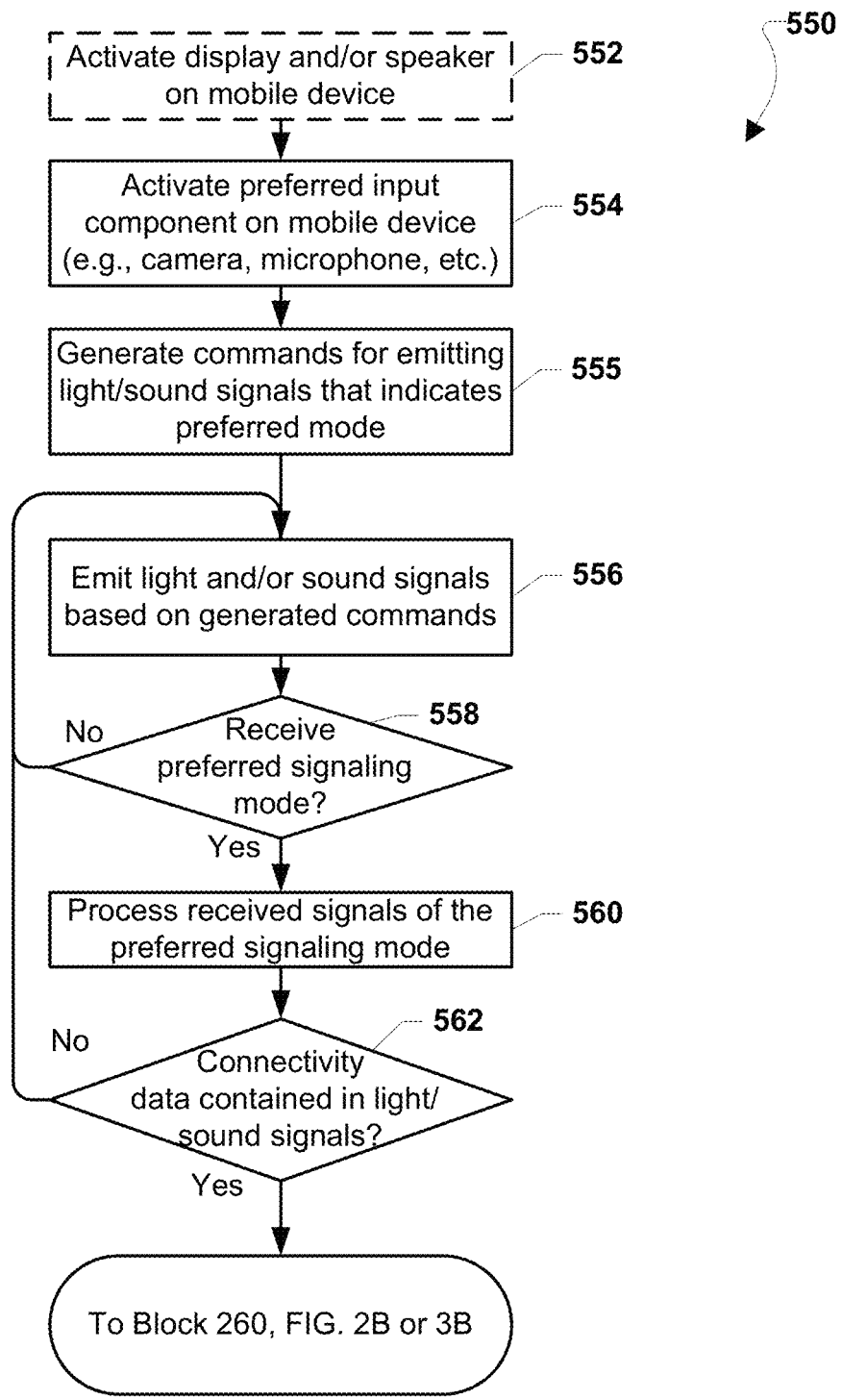
FIG. 5B is a process flow diagram illustrating an embodiment method for a mobile device joining a communication group based on received light and/or sound signals delivered in a preferred mode from a third-party mobile device.

FIG. 5B illustrates an embodiment method 550 for a mobile device joining a communication group based on received signaling information emitted by a signaling device in a preferred mode. As described above, the mobile device may be configured to receive a particular format of light and/or sound signals, which may be its preferred mode. In an embodiment, the preferred mode may be a variable or setting stored within the mobile device, or alternatively, a setting within an application related to the receipt and use of light and/or sound signals. For example, the mobile device may execute an application that detects signaling information based on colors represented within light signals. The mobile device may transmit messages, such as signaling information within light and/or sound signals, to the signaling device which may configure the signaling device to subsequently emit light and/or sound signals related to a group communication using the preferred mode. For example, the mobile device may request the signaling device emit sound signals containing signaling information describing connectivity data for contacting a communication group.

In optional block 552, the mobile device may activate a display unit and/or speaker unit. To emit light and/or sound signals that can be received and used by the signaling device, the mobile device may use similar display units and speaker systems as the signaling device's components described above with reference to FIG. 2B and FIG. 3B. For example, a smartphone mobile device may activate an LED indicator contained within its housing. In block 554, the mobile device may activate the input component that is related to the preferred mode. In an embodiment, the mobile device may activate the appropriate input component (e.g., camera, microphone, etc.) based on the settings of an application as described above. For example, the mobile device may determine that the application is configured to process light signals and thus may activate the camera.

In block 555, the mobile device may generate commands for emitting light and/or sound signals containing signaling information that indicates the preferred mode. For example, the mobile device may generate a series of commands instructing a flash component (e.g., camera flash bulb on the back of a smartphone) to engage its flash a certain number of times within a certain time period. In an embodiment, the mobile device may perform an encoding algorithm to convert the preferred mode information into signaling information to be delivery via light and/or sound signals. In an embodiment, generating the commands to emit the preferred mode may be considered an opposite operation from the processing operations described in block 256 with reference to FIG. 2B.

In block 556, the mobile device may emit light and/or sound signals based on the generated commands. In an embodiment, the mobile device may periodically repeat execution of the generated commands until light and/or sound signals conforming to the preferred mode is received, or alternatively, the mobile device may execute the generated commands a set number of times. For example, based on the generated commands, the mobile device may emit sound signals indicating the preferred mode every few seconds.

In determination block 556, the mobile device may determine whether any light and/or sound signals conforming to the preferred mode is received. In an embodiment, the operations in determination block 556 may be similar to the operations in either determination block 254 or determination block 354 as described above with reference to FIG. 2B and FIG. 3B, respectively. For example, the mobile device may evaluate camera data to determine whether preferred mode light signals have been received. If the preferred mode light and/or sound signals have not been received (i.e., determination block 558="No"), the mobile device may continue to execute the generated commands in block 556. However, if the preferred mode light and/or sound signals have been received (i.e., determination block 558="Yes"), in block 560 the mobile device may process the received preferred mode light and/or sound signals. The operations of block 560 may be similar to the operations in blocks 256 and 356 with reference to FIGS. 2B and 3B respectively. For example, the mobile device may determine whether received light and/or sound signals contains signaling information and may decode the signaling information to detect connectivity data.

Similar to the operations described above with reference to determination block 258 of FIG. 2B and determination block 358 of FIG. 3B, in determination block 562 the mobile device may determine whether the received light and/or sound signals contains connectivity data, such as an IP address or contact information for a social networking association. If no connectivity data is contained in the received light and/or sound signals (i.e., determination block 562="No"), the mobile device may continue with the operations in block 556. If connectivity data is contained in the received light and/or sound signals (i.e., determination block 562="Yes"), the mobile device may continue with the operations in determination block 260 with reference to FIG. 2B or 3B.

Figure 5C:
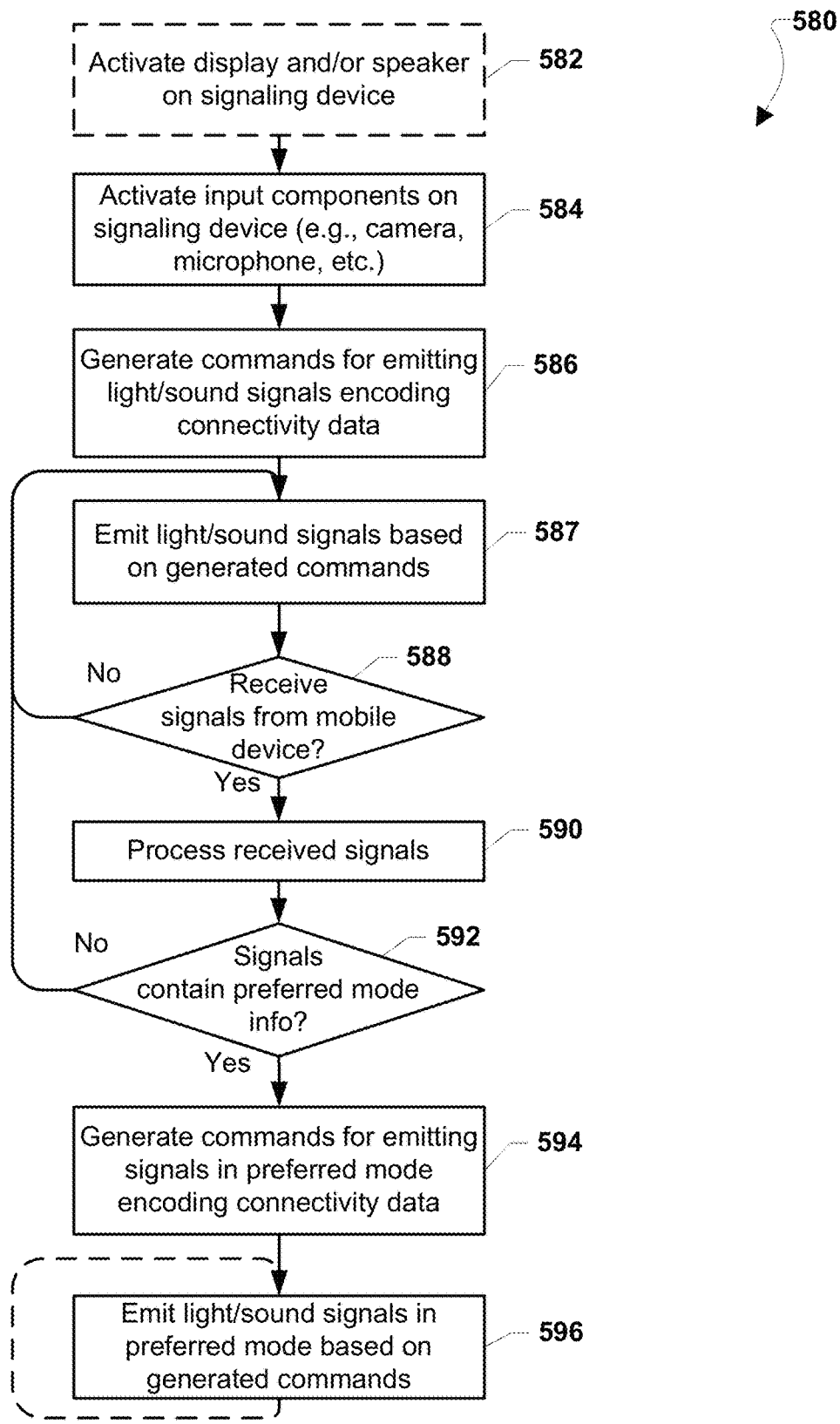
FIG. 5C is a process flow diagram illustrating an embodiment method for a third-party mobile device delivering light and/or sound signals in a mode preferred by a mobile device.

FIG. 5C illustrates an embodiment method 580 for a signaling device emitting light and/or sound signals in a mode preferred by a mobile device. The method 580 may be considered a companion method for the method 550 described above. In FIG. 5C, the signaling device may perform the operations of method 580 to receive preferred mode information from the mobile device and emit light and/or sound signals in the preferred mode. In an embodiment, the operations of method 580 may be similar to the operations of method 550, with the exception that they are performed by the signaling device (instead of the mobile device) and the signaling device may not execute operations to join a communication group based on received light and/or sound signals.

In optional block 582, similar to the operations in optional block 552, the signaling device may activate a display unit or speaker used to emit light and/or sound signals, such as flashing lights, images, or sounds. In block 584, the signaling device may activate input components, such as a camera and/or a microphone, used for receiving light and/or sound signals from the mobile device. In block 586, the signaling device may generate commands for emitting light and/or sound signals indicating connectivity data related to an associated communication group. Similar to the operations of block 555 described above with reference to FIG. 5B, the signaling device may convert connectivity data, such as a URL, SIP URI, Facebook group contact information, etc., into encoded signaling information. Based on the output devices of the signaling device, such as LED indicators, connected lights, and speaker units, the signaling device may generate a list of software commands that, when executed by the signaling device, may instruct the signaling device components to output the encoded signaling information as light and/or sound signals. For example, the commands may direct an LED display to emit a sequence of patterns corresponding to an IP address.

In block 587, the signaling device may emit light and/or sound signals based on the generated commands. In determination block 588, the signaling device may determine whether light and/or sound signals from the mobile device have been received. For example, the signaling device may periodically monitor or listen for light and/or sound signals from devices within a nearby distance. If light and/or sound signals has not been received (i.e., determination block 588="No"), the signaling device may continue with the operations in block 587.

However, if light and/or sound signals has been received from the mobile device (i.e., determination block 588="Yes"), in block 590 the signaling device may process the received light and/or sound signals from the mobile device. In an embodiment, this processing may be equivalent to the operations as described above with reference to FIG. 2C or FIG. 3C. In determination block 592, the signaling device may determine whether the processed light and/or sound signals contained information describing the preferred mode of the mobile device. In an embodiment, the signaling device may decode signaling information within received light and/or sound signals and compare decoded elements to predefined keywords, codes, or indicators that correspond to a preferred mode communication. For example, the signaling device may store a data table listing special decoded terms, codes, and/or phrases that are predefined by the mobile device and used to communicate particular types of information within light and/or sound signals broadcasts (e.g., a signaling language database). As another example, the processed and decoded light and/or sound signals may be a message with header data indicating that the message describes a preferred mode. If the processed light and/or sound signals does not contain preferred mode information (i.e., determination block 592="No"), the signaling device may continue with the operations in block 587.

If the processed light and/or sound signals does contain preferred mode information (i.e., determination block 592="Yes"), in block 594 the signaling device may generate new commands for emitting light and/or sound signals that indicates the connectivity data and that conforms with the preferred mode. For example, if the received preferred mode information requests sound signals, the signaling device may generate commands to execute that may prompt a connected speaker to emit a particular sequence of sounds. In block 596, the signaling device may emit the light and/or sound signals in the preferred mode based on the generated commands.

In an embodiment, the signaling device may continue to emit light and/or sound signals in the preferred mode, or alternatively, may only emit in the preferred mode for a predefined period. In an embodiment, the light and/or sound signals received from the mobile device indicating the preferred mode may additionally contain emitting parameters for the signaling device, such as duration of emitting preferred mode light and/or sound signals, volume or intensity of emitting, etc. For example, the signaling device may determine that received light and/or sound signals from the mobile device requests connectivity data be emitted as sound signals with a high rate of repetition.

Figure 6A:
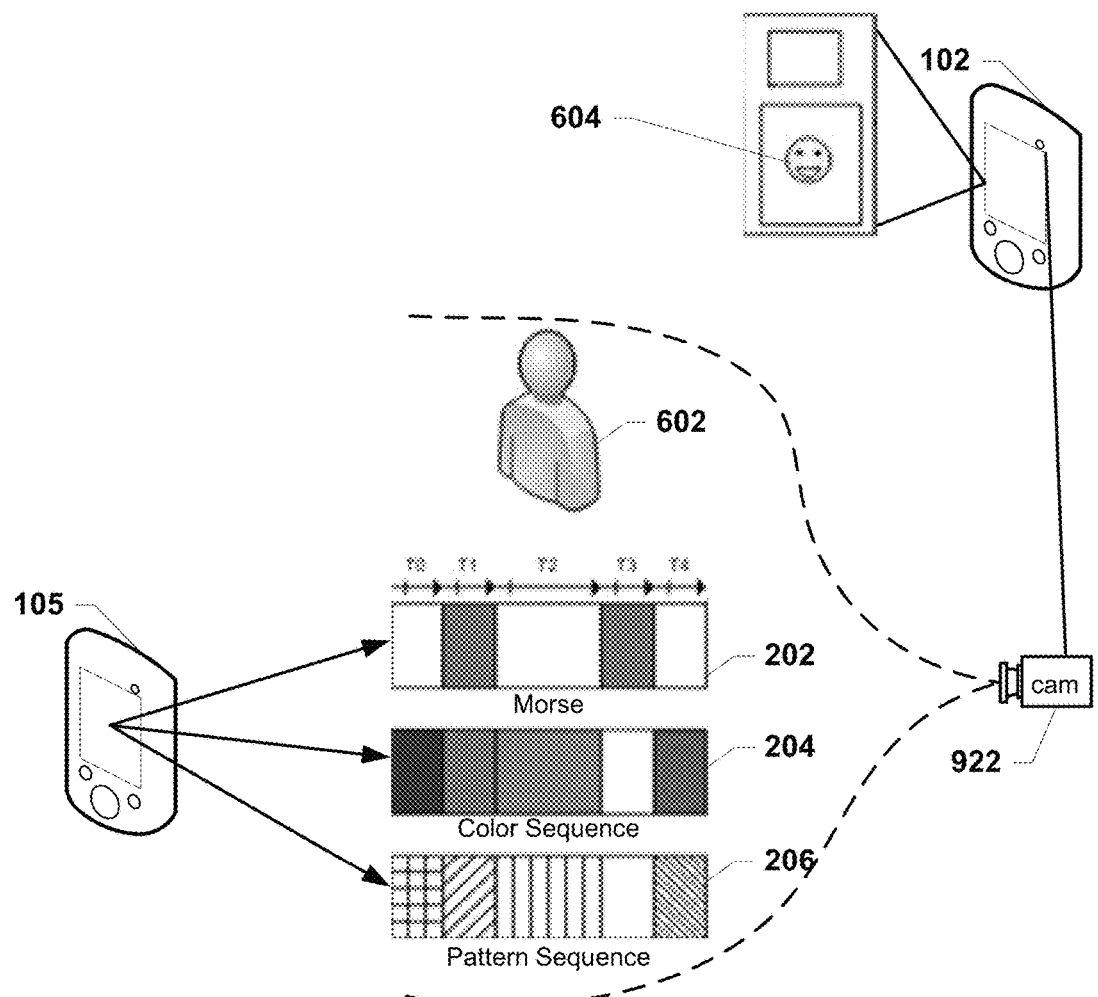
FIG. 6A is a diagram illustrating a mobile device receiving light and/or sound signals and imagery of an unknown third-party user.

FIG. 6A illustrates a diagram of a mobile device 102 receiving light and/or sound signals that includes a representation of an unknown third-party 602. Similar to as described above with reference to FIG. 2A, the mobile device 102 may utilize a camera 922 to receive the light signals emitted by the signaling device 105, which may include modulating, flashing, and/or changing sequences of light 202 (e.g., light flashes in Morse code), sequences of colors 204 (e.g., blue, red, yellow, etc.), and/or sequences of patterns 206 (e.g., cross-thatched lines, horizontal lines, vertical lines, angled lines, etc.). In many cases, the mobile device 102 may also receive light signals that include a representation or imagery 604 of the unknown third-party 602. For example, the signaling device 105 may be a smartphone held by the unknown third-party 602. As another example, the signaling device 105 may be a nightclub strobe light and the unknown third-party 602 may be a dancer under the light. In various embodiments, when the unknown third-party 602 is in proximity of the signaling device 105, the mobile device 102 may receive light signals that include the imagery 604 of the third-party 602 as he/she enters the camera 922 line-of-sight or viewing area.

Figure 6B:
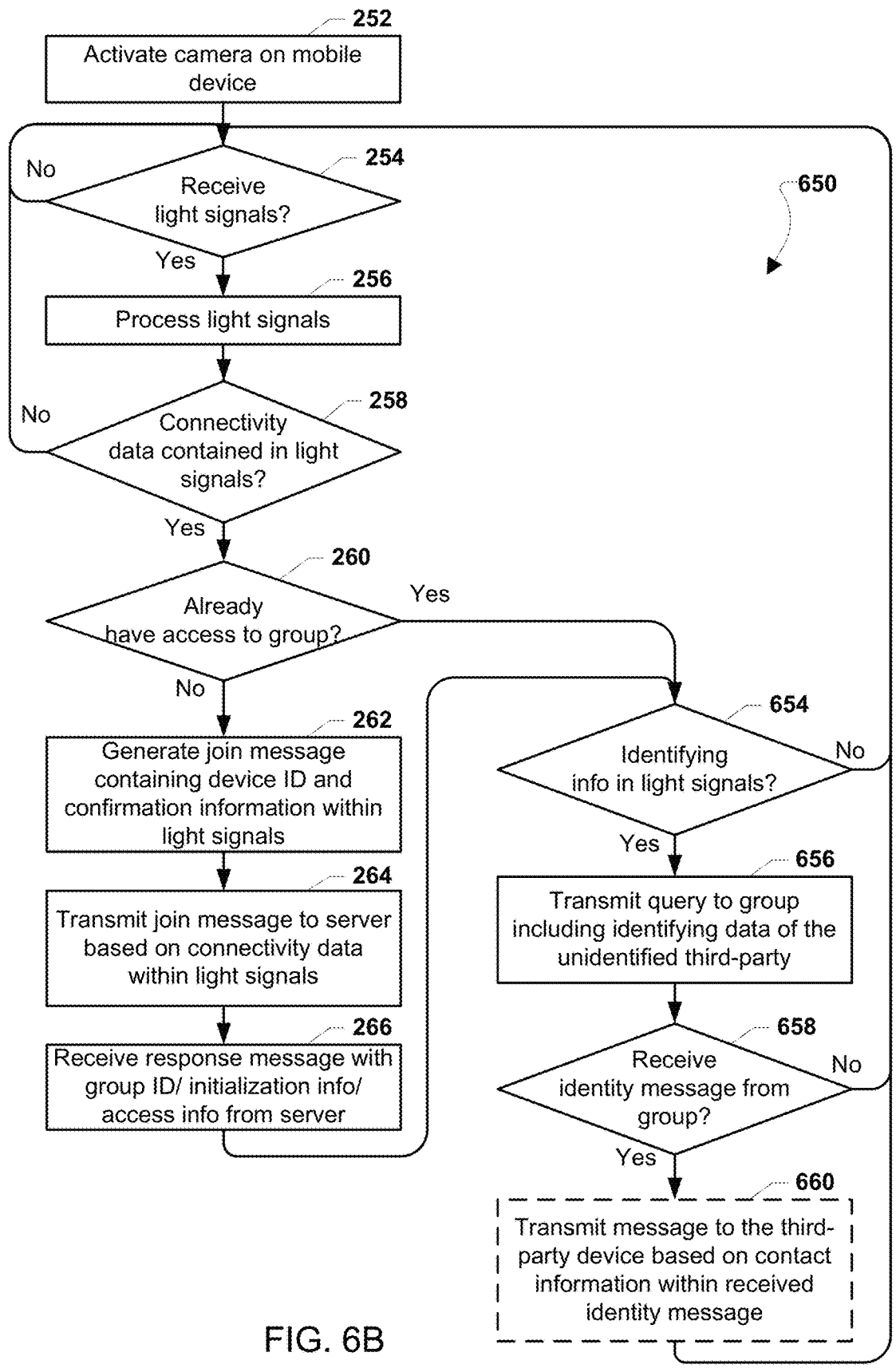
FIG. 6B is a process flow diagram illustrating a mobile device processing light and/or sound signals and imagery of an unknown third-party user.

FIG. 6B illustrates an embodiment method 650 for a mobile device receiving light signaling information and utilizing imagery of an unknown third-party. The user of the mobile device may not only desire to join a communication group indicated within light signals emitted by a signaling device, but he/she may also desire to identify and contact particular people in the same area as the signaling device. The mobile device may join the communication group associated with received light signals, and transmit query messages to the communication group to identify the unknown third-party based on imagery collected at the time of receiving the light signals. For example, the mobile device may query all users of a Facebook communication group associated with a house-party to identify a particular third-party who also attended the house-party.

The method 650 may be similar to as described above with reference to FIG. 2B, with the exception that the mobile device may also perform identification operations based on received imagery or representations of the third-party. In block 252, the mobile device may activate a contained or connected camera, and in determination block 254 may determine whether light signals are received. In another embodiment, the mobile device may monitor for and utilize sound signals in combination or in place of light signals. If no light signals are received (i.e., determination block 254="No"), the mobile device may continue with the operations in determination block 254. If light signals are received (i.e., determination block 254="Yes"), in block 256 the mobile device may process the light signals to detect related signaling information. In determination block 258, the mobile device may determine whether connectivity data is contained in the processed light and/or sound signals, and if not (i.e., determination block 258="No"), the mobile device may continue with the operations in determination block 254. If connectivity data was contained within the received light signals (i.e., determination block 258="Yes"), in determination block 260 the mobile device may determine whether the user is already a member of (or has access to) the group indicated by the connectivity data. If there is not already access to the group (i.e., determination block 260="No"), in block 262 the mobile device may generate a join message, such as a message containing device identifier and confirmation information from the received light signals. In block 264, the mobile device may transmit the join message to a server based on the connectivity data within the received light signals, such as by using contact information described within the connectivity data. In block 266, the mobile device may receive a response message with group identification, access codes, and other initialization information from the server indicating entry into the communication group.

When the user is a member of and/or has access to the communication group (i.e., determination block 260="Yes" or the mobile device performs operations in blocks 262, 264, and 266), in determination block 654 the mobile device may determine whether the light signals contain a visual representation or identifying imagery relating to the unknown third party. In various embodiments, the identifying imagery may include video or still images (e.g., individual photographic frames) of the unknown third-party's body, face, distinctive features (e.g., hair, tattoos, etc.), and clothing (e.g., color of jacket, style of skirt, symbols or patches on shirts, logos on hats, etc.). The mobile device may perform image processing operations similar to those in block 282 as described above with reference to FIG. 2C, and may detect identifying imagery associated with the unknown third-party based on image processing techniques, such as contrast evaluations, detected movement within image sequences, and pixel coloration evaluations.

If the mobile device does not detect any identifying imagery relating to the unknown third-party (i.e., determination block 654="No"), the mobile device may continue with the operations in determination block 254. Alternatively, the mobile device may conduct additional iterative image processing operations to detect third-party imagery. For example, the mobile device may adjust the operating parameters of image processing routines to more finely evaluate imagery within the light signals and detect third-party images.

If the identifying imagery is found within the light signals (i.e., determination block 654="Yes"), in block 656 the mobile device may transmit a query message to the communication group and/or the individual member devices associated with the communication group. For example, the mobile device may transmit message to the server of the communication group or the mobile devices of the other communication group members. The query message may include a representation of the third-party, such as the identifying imagery, as well as a request for further information. For example, the query message may be an email that includes an attached photo representing the unknown third-party. In another embodiment, the query message may be a specially formatted communication that includes metadata that indicates the query and request for further information.

In various embodiments, the query message may be any digital communication that the communication group is configured to distribute to the associated communication group members, such as an SMS text message, email, voice message, website message board posting, etc. In an embodiment, the mobile device may utilize contact information for individual communication group members stored on the communication group server or other devices associated with the communication group. For example, the mobile device may perform look-up operations on an address book database stored within the communication group server, and may transmit query messages to contact information found within the database (e.g., email addresses, smartphone numbers, etc.). In an embodiment, the query message may contain a unique identifying code or indicator which the mobile device may use to compare with subsequently received messages to determine whether the received messages regard the query message.

In determination block 658, the mobile device may determine whether an identity message is received that contains additional identification of the unknown third-party in response to the query message. For example, identity messages may be transmitted from other group member devices that received the query message and who recognized the unknown third-party within the query message. As another example, the communication group server may receive the query message, perform facial recognition operations to identify the unknown third-party, and return an identity message to the mobile device. In various embodiments, identity messages may be transmitted automatically based on procedural evaluations of the identifying imagery or, alternatively, based on user input, such as a group member replying to a query message email.

If no identity message is received that identifies the unknown third-party (i.e., determination block 658="No"), the mobile device may continue with the operations in determination block 254. In an embodiment, the mobile device may continually and periodically transmit the query message until an identity message is received, a predefined time period elapses, or the user provides input causing a cessation of the query message transmissions.

If an identity message is received that identifies the unknown third-party (i.e., determination block 658="Yes"), in optional block 660 the mobile device may transmit a message to the identified third-party based on contact information within a response message. For example, the mobile device may transmit an SMS text message to the third-party's mobile device based on the identity message. In another embodiment, the mobile device may determine the identified third-party's contact information by querying the communication group server's stored information using identification information provided in the identity message. For example, the identity message may only contain the third-party's name, which may be used to query an address book database within the communication group server and determine the third-party's email address, smartphone number, Facebook username, etc.

In another embodiment, the mobile device may perform the identification operations of blocks 654-660 using received sound signals containing audible representations or sounds of the unknown third-party. For example, instead of only detecting identifying imagery of the unknown third-party, the mobile device may also receive an audio representation of the unknown third-party (e.g., video with audio data depicting the unknown third-party talking). The mobile device may segregate sound elements associated with the unknown third-party (i.e., the unknown third-party's voice) based on an analysis of lip movements in combination with evaluating sound signals received concurrently with light signals. In other words, the mobile device may match lip movements represented in imagery with a related voice in the audio data, and may isolate the matching voice from other audio information (e.g., ambient noises, other people talking, etc.). Alternatively, the mobile device may only receive sound signals, but may still segregate individual voices and may transmit the individual voices to the communication group via query messages to determine the identity of the unknown third-party.

Figure 7A:
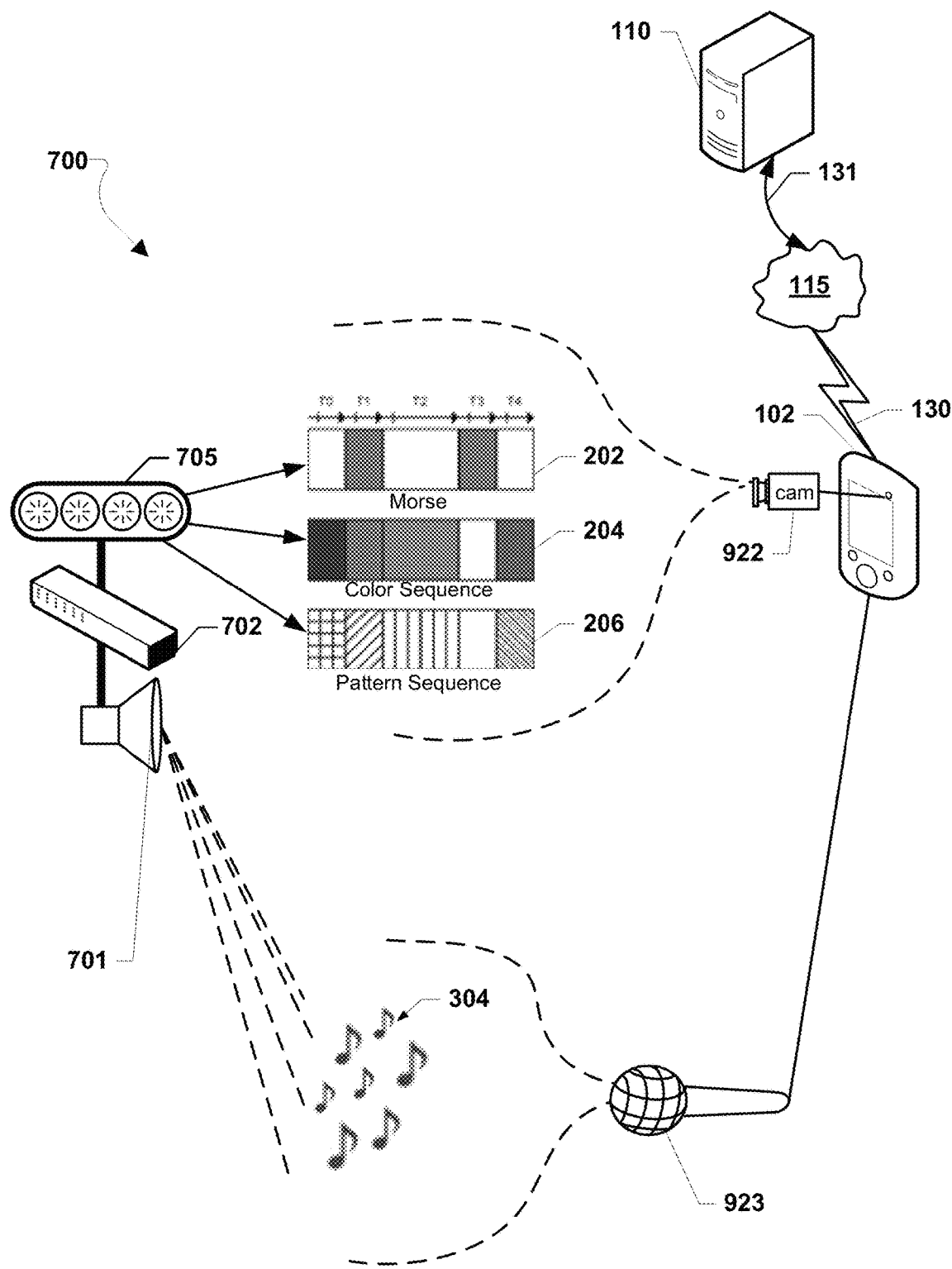
FIG. 7A is a diagram illustrating a mobile device receiving light signals with a camera and sound signals with a microphone.

As mentioned above, a signaling device may transmit signals using both sound and light, which may enhance reception by mobile devices, particularly in noisy or bright environments. FIG. 7A illustrates such an embodiment system 700 in which the signaling device 702 emits both light signals that may include changing sequences of light 202, sequences of colors 204, and/or sequences of patterns 206 from a light emitter 705 (e.g., an LED light), and sound signals 304 from a speaker 701. A mobile device 102 may receive the light signals that may include the various sequences 202, 204, 206 via a camera 922 (or other light sensor) and the sound signals 304 via microphone 923. The mobile device may then use the information obtained from decoding the light signals, the sound signals or both light and sound signals to communicate via a data link 130 with a server 110 connected via a data link 131 to a Internet/telecommunications network 115, such as to request to join a communication group indicated by the received signals.

Figure 7B:
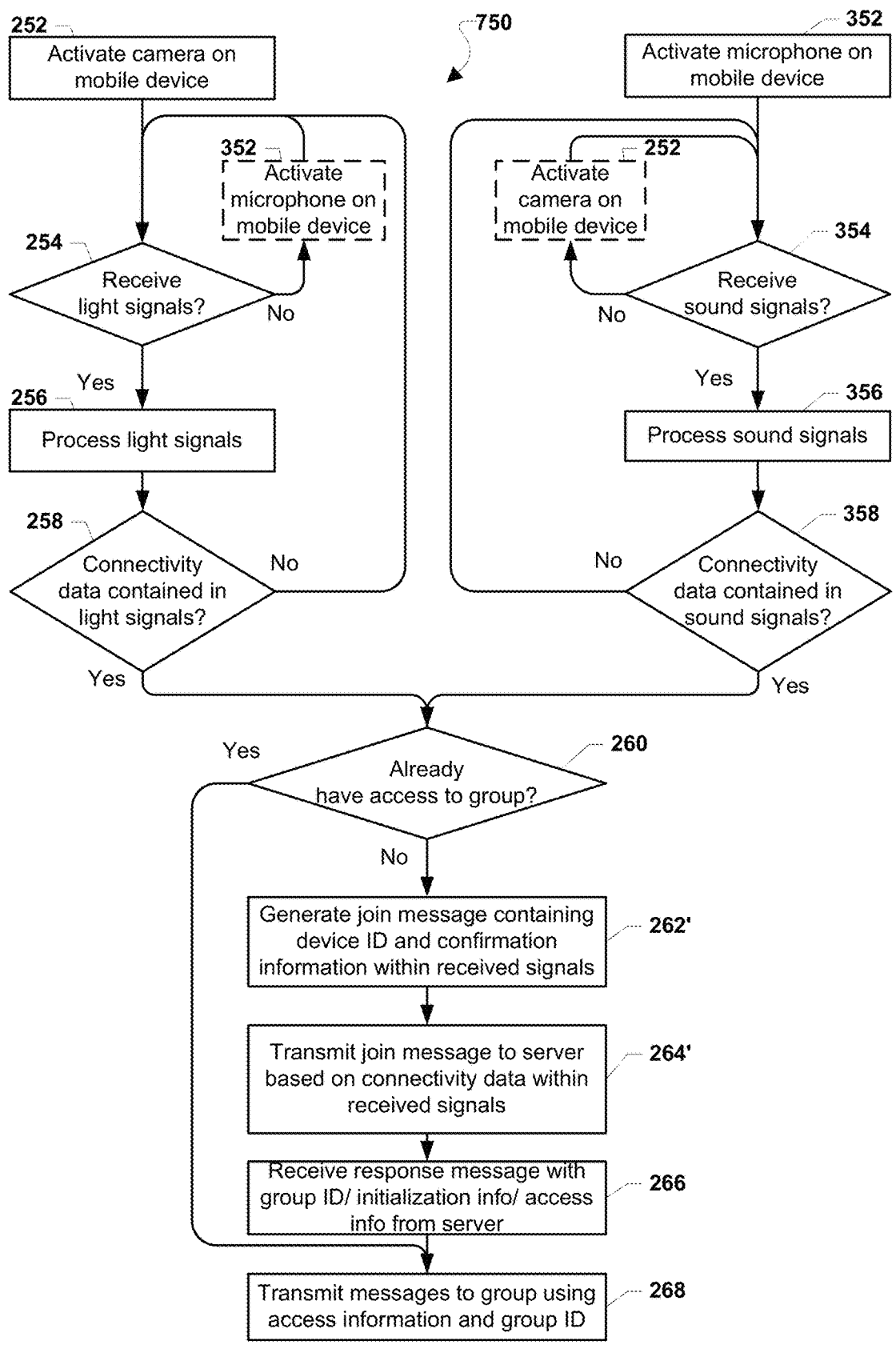
FIG. 7B is a process flow diagram illustrating an embodiment method for a mobile device joining a communication group based on received signals from a signaling device.

FIG. 7B illustrates an embodiment method 750 that may be implemented on a mobile device to receive group communication joining information from light and/or sound signals when a signaling device is using both communication media. Method 750 is similar to the method 250 and the method 350 described above with reference to FIGS. 2B and 3B, respectively, so a further description of like number blocks is not required. A primary difference in method 750 is that the mobile device may activate both a camera in block 252 and a microphone in block 352 simultaneously, and perform operations in blocks 254, 256, 258 and 354, 356 and 358 in parallel. In various embodiments, light signals that are contemporaneously received with sound signals may include elements or other information that may augment the information within the sound signals, and vice versa as described above. For example, the light and sound signals may not include redundant signaling information, but instead may be combined to include encoded or complex signaling information, messages, or other data.

In an optional embodiment, if the mobile device executing the method 750 determines that it does not receive light signals (i.e., determination block 254="No"), in optional block 352 the mobile device may activate the microphone on the mobile device, if not already activated, and may continue to execute the operations in determination block 254. For example, when light signals are determined to not have been received, the mobile device may activate microphone sensors (or check that microphone sensors are indeed active). In a similar manner, if the mobile device determines that it does not receive sound signals (i.e., determination block 354="No"), in optional block 252 the mobile device may activate the camera, if not already activated, and may continue to execute the operations in determination block 354. These optional operations may ensure that the mobile device has an improved opportunity to receive incoming connectivity data using various input sensors and signal types (e.g., sound and/or light signals). In an alternative embodiment, the mobile device may be configured to display a message to a user (e.g., via an LED or graphical user interface display) indicating that light and/or sound signals have or have not been received. For example, when it is determined that no light signals (or sound signals) are received, the mobile device may render a message to its user indicating that no connection is possible yet or no connectivity data is currently available.

Additionally, the operations in blocks 262'-264' may utilize information within any type of signal that was received by the mobile device and that contains data. In other words, in block 262' the mobile device may generate a join message containing device identifier and confirmation information from light signals and/or sound signals, and in block 264' the mobile device may transmit a join message to a server associated with the group based on connectivity data within light signals and/or sound signals.

Figure 7C:
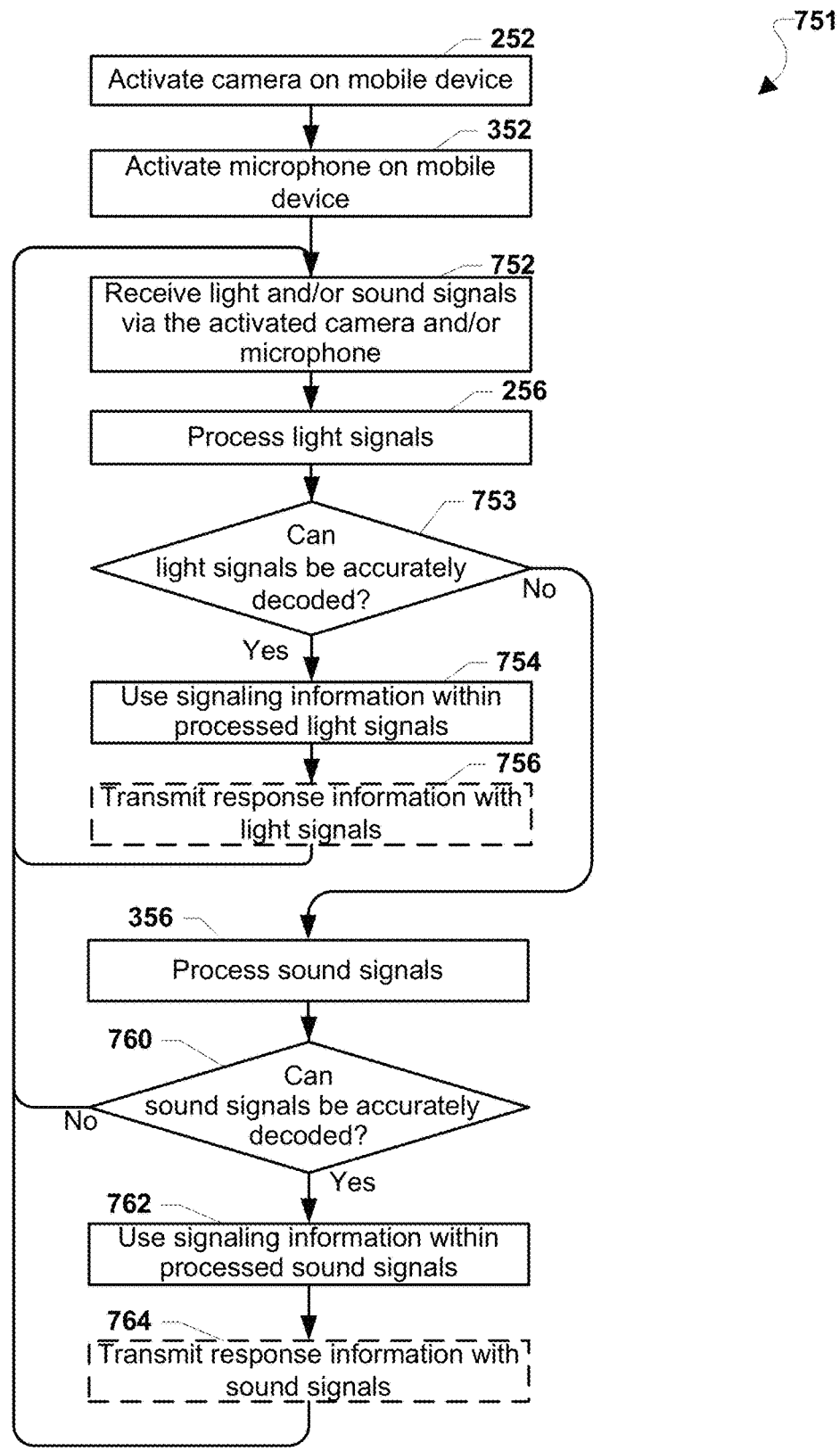
FIG. 7C is a process flow diagram illustrating an embodiment method for a mobile device to process and transmit light and/or audio signals based on viability of signals within a current environment.

FIG. 7C illustrates an embodiment method 751 for a mobile device to process and transmit light and/or audio signals based on the anticipated communication quality/effectiveness of the signals within current ambient conditions. As described above, the mobile device may utilize various types and manners of signaling, such as emitting different types/pitches/volumes of sound signals and/or light signals of varying pulse formats, intensities and colors. For example, light signals may be emitted at higher brightness or intensity in order to render information in a more detectable manner when ambient conditions are bright. However, the mobile device may utilize multiple types of signals (e.g., both sound and light signals) to increase the robustness and bandwidth of communications between mobile devices (and signaling devices) configured to utilize such signaling as a communication channel. In particular, based on degraded signaling information, such as lost, muffled, incomplete, corrupted, interrupted, obscured, undetectable, or otherwise unintelligible signals, the mobile device may be configured to replace, supplement, and/or otherwise complete signaling information from one type of signaling with received signaling information from another type of signaling. For example, when received light signals cannot be accurately converted into useable data due to ambient light conditions (e.g., daylight, bright lights in a room, strobe lights, etc.), the mobile device may utilize sound signals contemporaneously received to obtain the information that could not be obtained from the light signals. As another example, when the mobile device is too far from a signaling device to receive reliable and timely sound signals, the mobile device may utilize light signals contemporaneously received from the signaling device. In other words, the mobile device may establish more robust communication channels capable of exchanging data in perpetuity by utilizing different forms of concurrent signaling to transmit and/or receive signaled information.

In block 252, the mobile device may activate a camera on the mobile device, such as a video camera embedded within a smartphone. In block 352, the mobile device may also activate a microphone on the mobile device, such as the microphone used for telephone calls or a microphone coupled to the video camera. In various embodiments, the mobile device may activate other components, sensors, or other units that may be used to capture or record other forms of signaling (e.g., accelerometers to receive vibrations, etc.).

In block 752, the mobile device may receive light and/or sound signals via the activated camera and/or microphone. For example, the mobile device may record using the camera video data including light signaling (e.g., Morse code in flashing lights, etc.) and/or record using the microphone audio data including sound signaling (e.g., a high-pitched sound sequence, etc.). In block 256, the mobile device may process the light signals. For example, the mobile device may process the light signals recorded by the video camera to detect signaling information included within the video data. In determination block 753, the mobile device may determine whether the light signals can be processed and used to effectively transmit or recover received messages. In other words, based on the processing of the light signals to detect signaling information, the mobile device may determine whether the light signals can be reliably and/or accurately decoded to obtain the complete message, such as information that can be used for joining a communication group. For example, the mobile device may determine whether the light signals included instructions, configuration data, or other operations that are properly formatted for execution by the mobile device. If the mobile device determines that the processed light signals can be accurately decoded (i.e., determination block 753="Yes"), in block 754 the mobile device may use the signaling information within the processed light signals. For example, the mobile device may execute scripts, commands, or other instructions indicated by the processed light signals, such as commands for the mobile device to render a certain message. As another example, the mobile device may perform operations to access a group indicated by the received light signals (e.g., access a URL within the light signals, etc.).

As the light signals are determined to be viable as received from other devices, the mobile device may use the same signaling format to improve the effectiveness of its own signaling to other devices. Thus, in optional block 756, the mobile device may transmit response information with light signals, and may continue with the operations in block 752. For example, based on determining received light signals are useable and complete, the mobile device may be configured to transmit subsequent messaging to proximate devices via light signals. Such response information may be transmitted using light signals that have the same or similar parameters (e.g., intensity, brightness, pitch, frequency, etc.) as the received, decoded light signals. In various embodiments, response information may include confirmation receipt messages or other messaging, such as messages that include authentication information to be used by other devices (e.g., passwords for joining a group or accessing a particular URL, etc.).

If the mobile device determines that the processed light signals cannot be accurately decoded (i.e., determination block 753="No"), in block 356 the mobile device may process the sound signals, such as the sound signals received with the operations in block 752. For example, the mobile device may process the sound signals to detect embedded audio patterns or sequences that can be decoded by the mobile device to obtain the message or signaled information. In an embodiment, the mobile device may activate the microphone (i.e., perform the operations in block 352), or alternatively check to ensure the microphone is activated, receive sound signals, and process the received sound signals when the light signals cannot be used. In determination block 760, the mobile device may determine whether the processed sound signals can be accurately decoded. Similar to the operations described above with reference to determination block 753, the mobile device may determine whether the processed and decoded sound signals include a complete message or signaled information, such as complete URL addresses and/or software instructions that may be executed by the mobile device in order to join a communication group. If the mobile device determines it cannot use (i.e., accurately decode) the sound signals (i.e., determination block 760="No"), the mobile device may continue with the operations in block 752. In an embodiment, the mobile device may activate the camera (i.e., perform the operations in block 252), or alternatively check to ensure the camera is activated, receive light signals, and process the received light signals when the sound signals cannot be used. If the mobile device determines it can use (i.e., decode) the sound signals (i.e., determination block 760="Yes"), in block 762, the mobile device may use the signaling information within the processed and decoded sound signals. For example, the mobile device may perform operations to access a website indicated in the signaled information obtained by decoding the processed sound signals, or alternatively may perform operations to display or render information received within the signals. In optional block 764, the mobile device may transmit response information with sound signals. In other words, as the mobile device successfully receives the signaling information via the received sound signals, the mobile device may transmit subsequent or responsive signaling information via sound signals. The mobile device may continue with the operations in block 752.

In FIG. 7C, the mobile device performing the method 751 may be configured to preferentially process light signals instead of sound signals by default. However, in various embodiments, the mobile device may be configured to preferentially process sound signals by default instead of light signals. In other words, the operations in block 256 may only be performed by the mobile device when received sound signals are determined by the mobile device to be incomplete or unintelligible. In other embodiments, the mobile device may be configured to concurrently process received sound and light signals.

In an embodiment, the mobile device may be configured to alert the user when performing hand-shaking (i.e., executing in an 'onboarding' mode). Hand-shaking operations may be included within the operations in determination blocks 753 and/or 760. In other words, when determining whether processed, received sound or light signals can be accurately decoded, the mobile device may be performing hand-shaking operations to enable communications with other devices (e.g., a nearby signaling device emitting light and/or sound signals). The mobile device may be configured with a feedback mechanism that activates when hand-shaking operations are being performed and/or when hand-shaking operations have completed. For example, the mobile device may include a vibration motor that is triggered to vibrate when the mobile device is in an onboarding mode. As another example, the mobile device may emit audible indicators (e.g., a beep, a buzz, etc.) or light-encoded messages (e.g., text information on an LED screen, etc.) when hand-shaking operations are being performed or are completed. Such alerts or mechanisms may be useful so the user knows the status of the mobile device with respect to incoming light and/or sound signals, indicating when hand-shaking is done or when the user needs to continue pointing the sensors (e.g., microphone, camera, etc.) towards signal sources (e.g., speakers, flashing lights, etc.).

In another embodiment, when the mobile device is unable to accurately decode or otherwise connect to a signal source based on received light and/or sound signals, the mobile device may render information directing the user to reconnect to the signal source. For example, when light signals emitted from a nearby strobe light are not fully received or decoded, the mobile device may render a message on its attached touchscreen display (e.g., text that says "Point the screen towards the strobe light," a rendered image/picture of the strobe light, etc.) that indicates the user should reconnect with the strobe light to receive data.

As a non-limiting illustration, consider the example of a user walking outside in the daylight may carry a smartphone mobile device executing an app for processing light and/or sound signals. A nearby parking meter device may be configured to emit both sound signals and light signals that include signaling information describing the status of the parking meter device. For example, the signaling information within the light and/or sound signals from the parking meter device may indicate how much paid time is left on the meter. Because it is daylight, the mobile device may determine that the light signals from the parking meter device cannot be accurately decoded (i.e., the parking meter device's light signals may not be detected or cannot be completely distinguished due to the bright ambient conditions). However, the mobile device may process the sound signals also emitted by the parking meter device to determine that there are a few minutes of paid time left for an associated parking space. In response, the mobile device may display a message for the user indicating the remaining time left on the meter.

Figure 8:
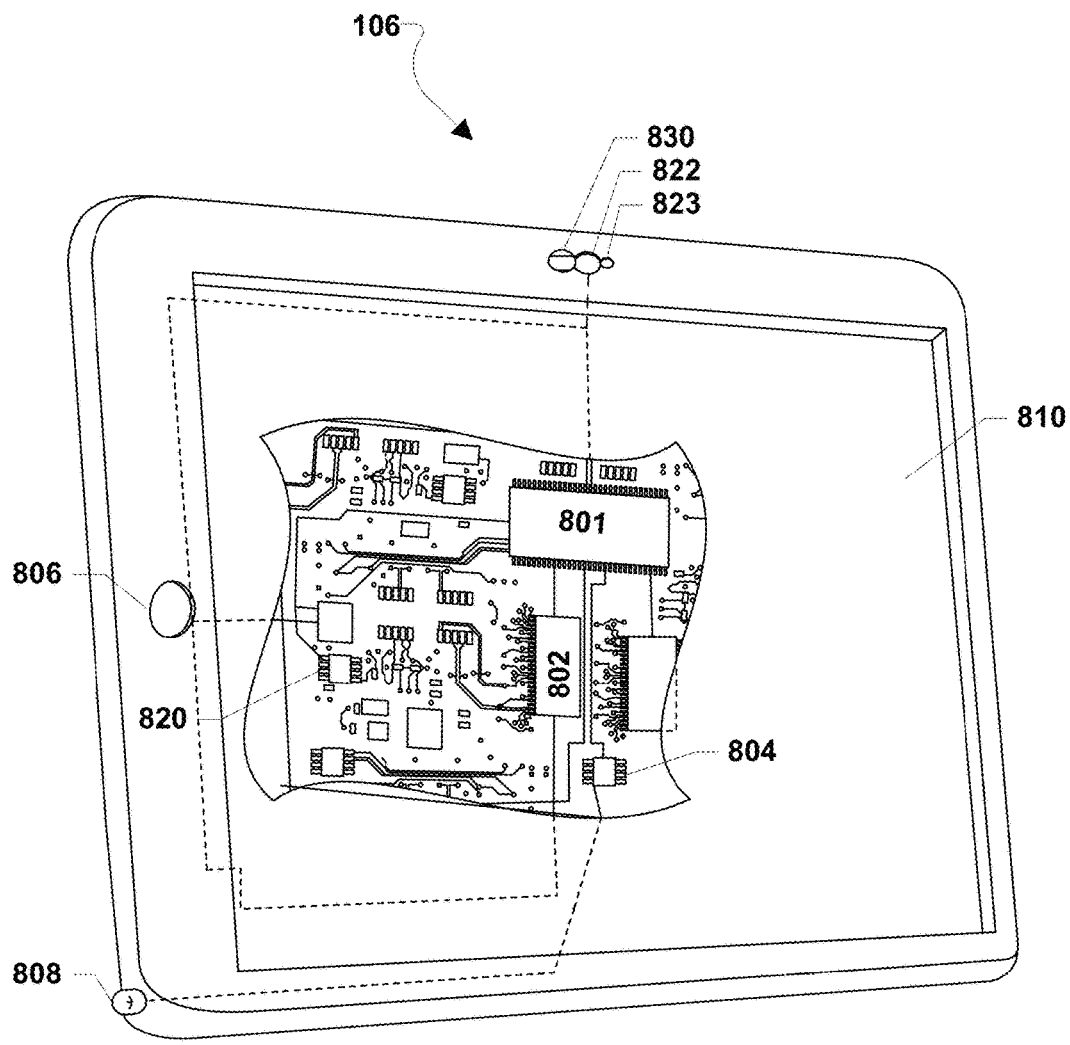
FIG. 8 is a component block diagram of an example tablet mobile computing device suitable for use with the various embodiments.

The various embodiments may be implemented in any of a variety of tablet mobile devices, an example of which is illustrated in FIG. 8. For example, the tablet mobile device 106 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The display 810 may be capable of emitting light, colors, symbols, and patterns (i.e., the display 810 may function as a light signal emitter). The tablet mobile device 106 may have one or more short-range radio signal transceivers 804 (e.g., Peanut, Bluetooth®, WiFi, Zigbee®, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile device 106 may include various network interfaces, such as a cellular network wireless modem chip 820 that enables communication via a cellular network. The tablet mobile device 106 may also include a physical button 806 for receiving user inputs. The tablet mobile device 106 may include various sensors, such as a camera 822 and a connected microphone 823 configured to capture and store still images and video data with corresponding audio data. The tablet mobile device 106 may also include a speaker 830 that is coupled to the processor 801 and that is configured to emit sound signals.

Figure 9:
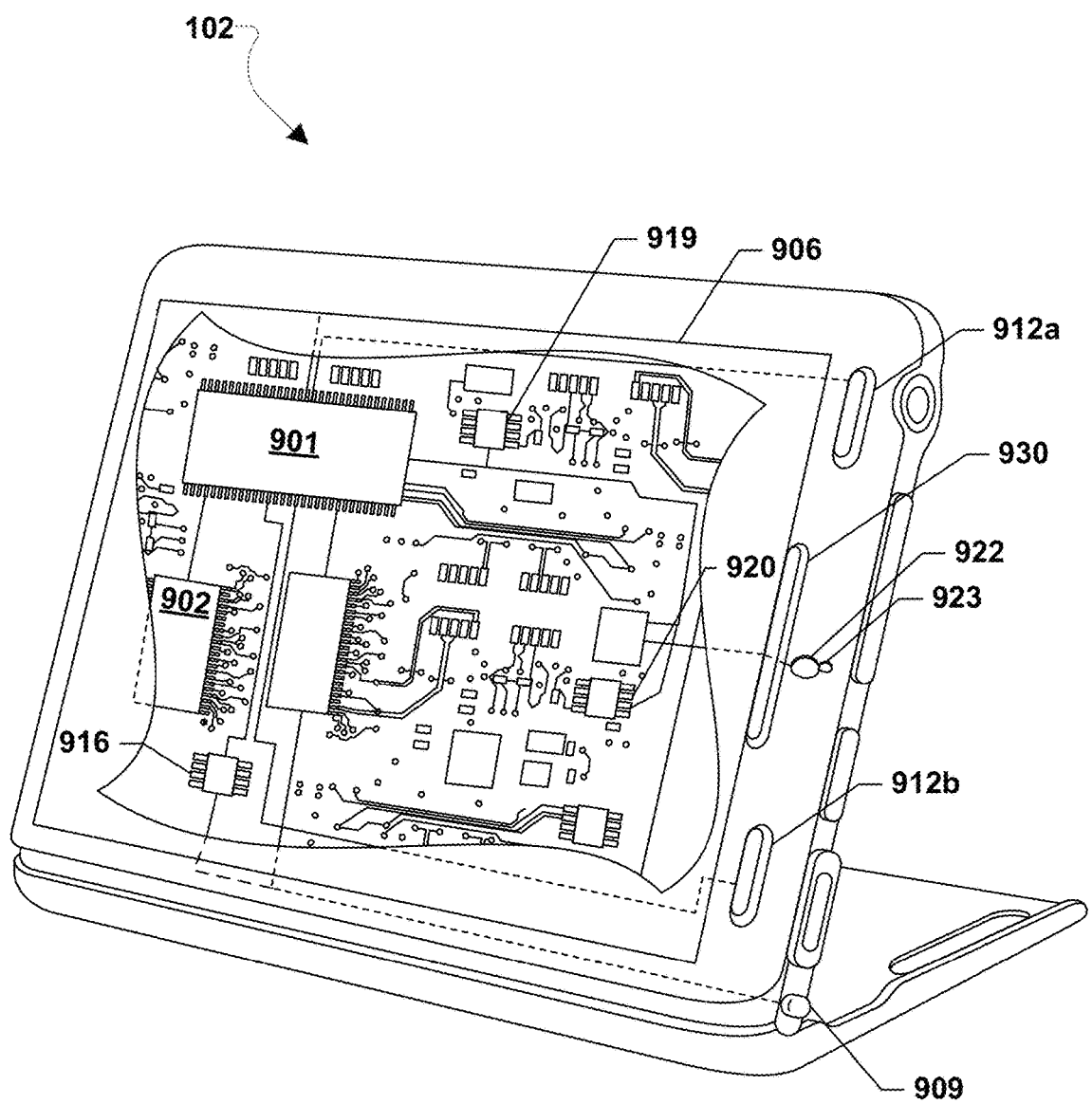
FIG. 9 is a component block diagram of an example smartphone mobile computing device suitable for use with the various embodiments.

The various embodiments may be implemented in any of a variety of mobile devices (e.g., smartphones, feature phones, etc.), an example of which is illustrated in FIG. 9. For example, the mobile device 102 may include a processor 901 coupled to internal memory 902. The internal memory 902 may be volatile or non-volatile memory, and may also be secure and/or encrypted memory, or unsecure and/or unencrypted memory, or any combination thereof. The processor 901 may also be coupled to a touch screen display 906, such as a resistive-sensing touch screen, capacitive-sensing touch screen infrared sensing touch screen, etc. Additionally, the display 906 of the mobile device 102 need not have touch screen capability. The display 906 may be capable of emitting light, colors, symbols, and patterns (i.e., the display may function as a light signal emitter). The mobile device 102 may have one or more short-range radio signal transceivers 916 (e.g., Peanut, Bluetooth®, WiFi, Zigbee®, RF radio) and antennas 909 for sending and receiving wireless signals as described herein. The transceivers 916 and antennas 909 may be used with the above-mentioned circuitry to implement the various wireless transmission protocol stacks/interfaces. The mobile device 102 may include various network interfaces, such as a cellular network wireless modem chip 920 that enables communication via a cellular network. The mobile device 102 may also include physical buttons 912a and 912b for receiving user inputs. The mobile device 102 may include various sensors, such as a camera 922 and a connected microphone 923 configured to capture and store still images and video data with corresponding audio data. The mobile device 102 may also include a speaker 930 that is coupled to the processor 901 and that is configured to emit sound signals.

Figure 10:
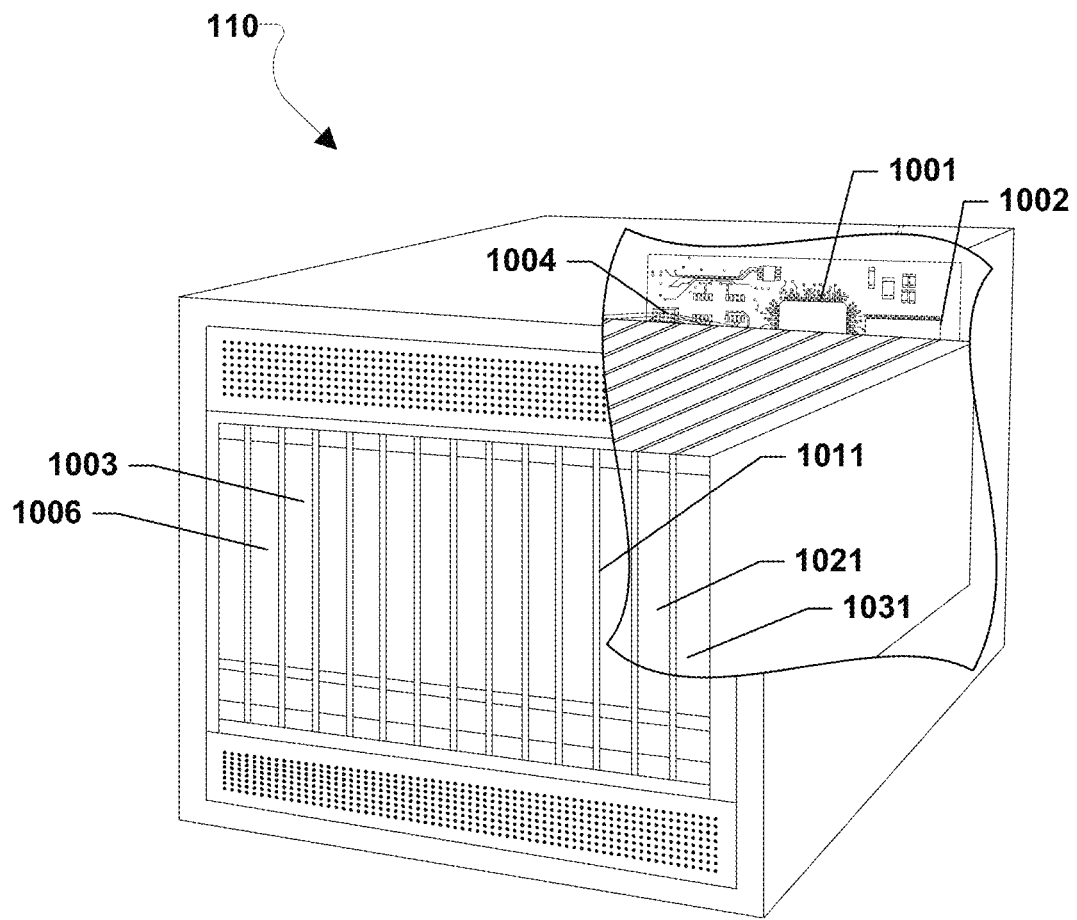
FIG. 10 is a component block diagram of an example server computing device suitable for use with the various embodiments.

The various embodiments may also be implemented on any of a variety of commercially available server computing devices, such as the server 110 illustrated in FIG. 10. Such a server 110 typically includes a processor 1001, and may include multiple processor systems 1011, 1021, 1031, one or more of which may be or include multi-core processors. The processor 1001 may be coupled to volatile internal memory 1002 and a large capacity nonvolatile memory, such as a disk drive 1003. The server 110 may also include a floppy disc drive, compact disc (CD) or DVD disc drive 1004 coupled to the processor 1001. The server 110 may also include network access ports 1006 coupled to the processor 1001 for establishing network interface connections with a network, such as a local area network coupled to other broadcast system computers and servers.

The processors 801, 901, 1001, 1011, 1021, and 1031 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 802, 902, and 1002 before they are accessed and loaded into the processors 801, 901, 1001, 1011, 1021, and 1031. The processors 801, 901, 1001, 1011, 1021, and 1031 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801, 901, 1001, 1011, 1021, and 1031 including internal memory or removable memory plugged into the various devices and memory within the processors 801, 901, 1001, 1011, 1021, and 1031.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a user of a mobile device to join a communication group, comprising:
    measuring ambient conditions within a recorded sample, wherein the ambient conditions include at least one of ambient noise or ambient light;
    determining parameters for receiving and/or transmitting signals based on the measured ambient conditions;
    receiving signals emitted by a signaling device using the determined parameters, wherein the received signals are at least one of light signals or sound signals;
    processing the received signals to obtain connectivity data for joining the communication group encoded within the received signals, wherein the connectivity data includes a digital address affiliated with the communication group; and
    transmitting messages to join the communication group using the obtained connectivity data when the user is not already a member of the communication group.

2. The method of claim 1, wherein the obtained connectivity data for joining the communication group includes one or more of URLs, email addresses, website portal information, IP addresses, session initiation protocol uniform resource identifiers, Facebook connection information, RSS feed information, listsery information, or Twitter feed information.

3. The method of claim 1, wherein receiving the signals emitted by the signaling device comprises receiving the light signals using a camera on the mobile device.

4. The method of claim 3, wherein the light signals encode the connectivity data for joining the communication group in one or more of colors, patterns, symbols, lights, or imagery.

5. The method of claim 3, wherein processing the received signals to obtain connectivity data for joining the communication group encoded within the received signals comprises:
    performing image processing routines on the received light signals to identify distinct light elements;
    comparing the distinct light elements to predefined signaling information, wherein the predefined signaling information includes predefined sequences and symbols, wherein the sequences include light elements having at least one of varying frequency, varying intensity, or varying duration; and
    decoding the distinct light elements to obtain the connectivity data for joining the communication group when the distinct light elements match the predefined signaling information based on the comparison.

6. The method of claim 1, wherein receiving the signals emitted by the signaling device comprises receiving the sound signals with a microphone on the mobile device.

7. The method of claim 6, wherein the sound signals include one or more of emitted tones, sounds, musical notes, voices, noise, notes, beeps, clicks, or and ultrasound.

8. The method of claim 6, wherein processing the received signals to obtain connectivity data for joining the communication group encoded within the received signals comprises:
    performing audio processing routines on the received sound signals to identify distinct sound elements;
    converting the identified distinct sound elements to distinct data values based on predefined thresholds;
    comparing the distinct data values to predefined signaling information, wherein the predefined signaling information includes predefined sequences, wherein the sequences include sound elements having at least one of varying frequency, varying volume, varying pitch, or varying duration; and
    decoding the distinct data values to determine connectivity data when the distinct data values match the predefined signaling information based on the comparison.

9. The method of claim 1, further comprising:
    emitting one of the sound signals or the light signals by the mobile device to indicate a preferred mode for receiving the signals from the signaling device, wherein the preferred mode describes a characteristic, type, or format of the signals emitted by the signaling device, and
    wherein receiving the signals emitted by the signaling device comprises receiving the signals emitted by the signaling device according to the preferred mode.

10. The method of claim 1, further comprising:
    detecting a representation of an unknown third-party within the received signals;
    transmitting to the communication group a query message that includes the detected representation and requests an identity of the unknown third-party; and
    receiving a message including the identity of the unknown third-party from the communication group.

11. The method of claim 10, wherein the detected representation of the unknown third-party includes at least one of an image of a face of the unknown third-party, an image of a body of the unknown third-party, an image of clothing of the unknown third-party, or sound of a voice of the unknown third-party.

12. The method of claim 1, further comprising:
    determining whether a first signal within the received signals can be accurately decoded, wherein the first signal is of a first signal type that is one of a sound signal or a light signal;
    activating a sensor associated with a second signal type when it is determined the first signal cannot be accurately decoded, wherein the sensor is one of a camera or a microphone; and
    processing a second signal within signals received with the activated sensor when it is determined the first signal cannot be accurately decoded, wherein the second signal is of the second signal type that is different from the first signal type,
    wherein processing the received signals comprises determining whether the received signals include complete connectivity data that can be used for joining the communication group.

13. A method for communicating connectivity data from a signaling device to enable a mobile device to join a communication group, comprising:
measuring ambient conditions within a recorded sample, wherein the ambient conditions include at least one of ambient noise or ambient light;
determining parameters for receiving and/or transmitting signals based on the measured ambient conditions; and
transmitting signals that encode connectivity data for joining the communication group using the determined parameters, wherein the signals are at least one of light signals or sound signals, and
wherein the connectivity data for joining the communication group includes one or more of URLs, email addresses, website portal information, IP addresses, session initiation protocol uniform resource identifiers, Facebook connection information, RSS feed information, listsery information, or Twitter feed information.

14. The method of claim 13, wherein the transmitted signals comprise light signals emitted by a light emitter, wherein the light signals encode the connectivity data for joining the communication group in one or more of colors, patterns, symbols, lights, or imagery.

15. The method of claim 14, wherein the light signals encode the connectivity data for joining the communication group in distinct light elements corresponding to predefined signaling information including predefined sequences and symbols.

16. The method of claim 13, wherein the transmitted signals comprise the sound signals emitted from a speaker, wherein the sound signals include one or more of emitted tones, sounds, musical notes, voices, noise, notes, beeps, clicks, or ultrasound.

17. The method of claim 16, wherein the sound signals encode the connectivity data for joining the communication group in identify distinct sound elements including predefined sound sequences.

18. The method of claim 13, further comprising:
receiving signals emitted by the mobile device, wherein the received signals are at least one of the light signals or the sound signals;
decoding the received signals to obtain information indicating a preferred mode for the mobile device to receive signals from the signaling device, wherein the preferred mode describes a characteristic, type, or format of the signals emitted by the signaling device; and
transmitting the signals encoding the connectivity data for joining the communication group according to the preferred mode.

19. A mobile device configured to join a communication group, comprising:
means for measuring ambient conditions within a recorded sample, wherein the ambient conditions include at least one of ambient noise or ambient light;
means for determining parameters for receiving and/or transmitting signals based on the measured ambient conditions;
means for receiving signals emitted by a signaling device using the determined parameters, wherein the received signals are at least one of light signals or sound signals;
means for processing the received signals to obtain connectivity data for joining the communication group encoded within the received signals, wherein the connectivity data includes a digital address affiliated with the communication group; and
means for transmitting messages to join the communication group using the obtained connectivity data when a user of the mobile device is not already a member of the communication group.

20. The mobile device of claim 19, wherein the obtained connectivity data for joining the communication group includes one or more of URLs, email addresses, website portal information, IP addresses, session initiation protocol uniform resource identifiers, Facebook connection information, RSS feed information, listsery information, or Twitter feed information.

21. The mobile device of claim 19, wherein the means for receiving signals emitted by the signaling device comprises a camera on the mobile device.

22. The mobile device of claim 21, wherein the light signals encode the connectivity data for joining the communication group in one or more of colors, patterns, symbols, lights, or imagery.

23. The mobile device of claim 21, wherein means for processing the received signals to obtain connectivity data for joining the communication group encoded within the received signals comprises:
means for performing image processing routines on the received light signals to identify distinct light elements;
means for comparing the distinct light elements to predefined signaling information, wherein the predefined signaling information includes predefined sequences and symbols, wherein the sequences include light elements having at least one of varying frequency, varying intensity, or varying duration; and
means for decoding the distinct light elements to obtain the connectivity data for joining the communication group when the distinct light elements match the predefined signaling information based on the comparison.

24. The mobile device of claim 19, wherein the means for receiving signals emitted by the signaling device comprises a microphone on the mobile device.

25. The mobile device of claim 24, wherein the sound signals include one or more of emitted tones, sounds, musical notes, voices, noise, notes, beeps, clicks, or ultrasound.

26. The mobile device of claim 24, wherein means for processing the received signals to obtain connectivity data for joining the communication group encoded within the received signals comprises:
means for performing audio processing routines on the received sound signals to identify distinct sound elements;
means for converting the identified distinct sound elements to distinct data values based on predefined thresholds;
means for comparing the distinct data values to predefined signaling information, wherein the predefined signaling information includes predefined sequences, wherein the sequences include sound elements having at least one of varying frequency, varying volume, varying pitch, or varying duration; and
means for decoding the distinct data values to determine connectivity data when the distinct data values match the predefined signaling information based on the comparison.

27. The mobile device of claim 19, further comprising:
means for emitting one of sound signals or light signals by the mobile device to indicate a preferred mode for receiving the signals from the signaling device, wherein the preferred mode describes a characteristic, type, or format of the signals emitted by the signaling device, and wherein the means for receiving signals emitted by the signaling device comprises means for receiving the signals emitted by the signaling device according to the preferred mode.

28. The mobile device of claim 19, further comprising:
means for detecting a representation of an unknown third-party within the received signals;
means for transmitting to the communication group a query message that includes the detected representation and requests an identity of the unknown third-party; and
means for receiving a message including the identity of the unknown third-party from the communication group.

29. The mobile device of claim 28, wherein the detected representation of the unknown third-party includes at least one of an image of a face of the unknown third-party, an image of a body of the unknown third-party, an image of clothing of the unknown third-party, or sound of a voice of the unknown third-party.

30. The mobile device of claim 19, further comprising:
means for determining whether a first signal within the received signals can be accurately decoded, wherein the first signal is of a first signal type that is one of a sound signal or a light signal;
means for activating a sensor associated with a second signal type when it is determined the first signal cannot be accurately decoded, wherein the sensor is one of a camera or a microphone; and
means for processing a second signal within signals received with the activated sensor when it is determined the first signal cannot be accurately decoded, wherein the second signal is of the second signal type that is different from the first signal type,
wherein means for processing the received signals comprises means for determining whether the received signals include complete connectivity data that can be used for joining the communication group.

31. A computing device configured to communicate connectivity data to enable a mobile device to join a communication group, comprising:
means for measuring ambient conditions within a recorded sample, wherein the ambient conditions include at least one of ambient noise or ambient light;
means for determining parameters for receiving and/or transmitting signals based on the measured ambient conditions; and
means for transmitting signals that encode the connectivity data for joining the communication group using the determined parameters, wherein the signals are at least one of light signals and sound signals, and
wherein the connectivity data for joining the communication group includes one or more of URLs, email addresses, website portal information, IP addresses, session initiation protocol uniform resource identifiers, Facebook connection information, RSS feed information, listsery information, and Twitter feed information.

32. The computing device of claim 31, wherein the transmitted signals comprise light signals emitted by a light emitter, wherein the light signals encode the connectivity data for joining the communication group in one or more of colors, patterns, symbols, lights, or imagery.

33. The computing device of claim 32, wherein the light signals encode the connectivity data for joining the communication group in distinct light elements corresponding to predefined signaling information including predefined sequences and symbols.

34. The computing device of claim 31, wherein the transmitted signals comprise the sound signals emitted from a speaker within the computing device, wherein the sound signals include one or more of emitted tones, sounds, musical notes, voices, noise, notes, beeps, clicks, or ultrasound.

35. The computing device of claim 34, wherein the sound signals encode the connectivity data for joining the communication group in identify distinct sound elements including predefined sound sequences.

36. The computing device of claim 31, further comprising:
means for receiving signals emitted by the mobile device, wherein the received signals are at least one of the light signals or the sound signals;
means for decoding the received signals to obtain information indicating a preferred mode for the mobile device to receive signals from the computing device, wherein the preferred mode describes a characteristic, type, or format of the signals emitted by the computing device; and
means for transmitting the signals encoding the connectivity data for joining the communication group according to the preferred mode.

37. A mobile device configured to join a communication group, comprising:
a memory;
a light sensor;
a microphone; and
a processor coupled to the memory, the light sensor and the microphone, wherein the processor is configured with processor-executable instructions to perform operations comprising:
measuring ambient conditions within a recorded sample, wherein the ambient conditions include at least one of ambient noise or ambient light;
determining parameters for receiving and/or transmitting signals based on the measured ambient conditions;
receiving, using the at least one of the light sensor and the microphone, signals emitted by a signaling device using the determined parameters, wherein the received signals are at least one of light signals or sound signals;
processing the received signals to obtain connectivity data for joining the communication group encoded within the received signals, wherein the connectivity data includes a digital address affiliated with the communication group; and
transmitting messages to join the communication group using the obtained connectivity data when a user of the mobile device is not already a member of the communication group.

38. The mobile device of claim 37, wherein the obtained connectivity data for joining the communication group includes one or more of URLs, email addresses, website portal information, IP addresses, session initiation protocol uniform resource identifiers, Facebook connection information, RSS feed information, listsery information, or Twitter feed information.

39. The mobile device of claim 37, wherein the processor is configured with processor-executable instructions to perform operations such that receiving signals emitted by the signaling device comprises receiving light signals using the light sensor on the mobile device, wherein the light sensor is a camera.

40. The mobile device of claim 39, wherein the light signals encode the connectivity data for joining the communication group in one or more of colors, patterns, symbols, lights, or imagery.

41. The mobile device of claim 39, wherein the processor is configured with processor-executable instructions to perform operations such that processing the received signals to obtain connectivity data for joining the communication group encoded within the received signals comprises:
   performing image processing routines on the received light signals to identify distinct light elements;
   comparing the distinct light elements to predefined signaling information, wherein the predefined signaling information includes predefined sequences and symbols, wherein the sequences include light elements having at least one of varying frequency, varying intensity, or varying duration; and
   decoding the distinct light elements to obtain the connectivity data for joining the communication group when the distinct light elements match the predefined signaling information based on the comparison.

42. The mobile device of claim 37, wherein the processor is configured with processor-executable instructions to perform operations such that receiving the signals emitted by the signaling device comprises receiving the sound signals with the microphone on the mobile device.

43. The mobile device of claim 42, wherein the sound signals include one or more of emitted tones, sounds, musical notes, voices, noise, notes, beeps, clicks, or ultrasound.

44. The mobile device of claim 42, wherein the processor is configured with processor-executable instructions such that processing the received signals to obtain connectivity data for joining the communication group encoded within the received signals comprises:
   performing audio processing routines on the received sound signals to identify distinct sound elements;
   converting the identified distinct sound elements to distinct data values based on predefined thresholds;
   comparing the distinct data values to predefined signaling information, wherein the predefined signaling information includes predefined sequences, wherein the sequences include sound elements having at least one of varying frequency, varying volume, varying pitch, or varying duration; and
   decoding the distinct data values to determine connectivity data when the distinct data values match the predefined signaling information based on the comparison.

45. The mobile device of claim 37, further comprising:
   a signal emitter configured to emit at least one of sound signals or light signals, wherein the processor is coupled to the signal emitter,
   wherein the processor is configured with processor-executable instructions to perform operations further comprising emitting, using the signal emitter, signals indicating a preferred mode for receiving the signals from the signaling device, wherein the preferred mode describes a characteristic, type, or format of the signals emitted by the signaling device, and
   wherein the processor is configured with processor-executable instructions to perform operations such that receiving signals emitted by the signaling device comprises receiving the signals emitted by the signaling device according to the preferred mode.

46. The mobile device of claim 37, wherein the processor is configured with processor-executable instructions to perform operations further comprising:
   detecting a representation of an unknown third-party within the received signals;
   transmitting to the communication group a query message that includes the detected representation and requests an identity of the unknown third-party; and
   receiving a message including the identity of the unknown third-party from the communication group.

47. The mobile device of claim 46, wherein the detected representation of the unknown third-party includes at least one of an image of a face of the unknown third-party, an image of a body of the unknown third-party, an image of clothing of the unknown third-party, or sound of a voice of the unknown third-party.

48. The mobile device of claim 37, wherein the processor is configured with processor-executable instructions to perform operations further comprising:
   determining whether a first signal within the received signals can be accurately decoded, wherein the first signal is of a first signal type that is one of a sound signal or a light signal;
   activating a sensor associated with a second signal type when it is determined the first signal cannot be accurately decoded, wherein the sensor is one of the light sensor or the microphone; and
   processing a second signal within signals received with the activated sensor when it is determined the first signal cannot be accurately decoded, wherein the second signal is of the second signal type that is different from the first signal type,
   wherein the processor is configured with processor-executable instructions to perform operations such that processing the received signals comprises determining whether the received signals include complete connectivity data that can be used for joining the communication group.

49. A computing device configured to communicate connectivity data to enable a mobile device to join a communication group, comprising:
   a memory;
   a signal emitter configured to emit at least one of sound signals and light signals, and
   a processor coupled to the memory and the signal emitter, wherein the processor is configured with processor-executable instructions to perform operations comprising:
      measuring ambient conditions within a recorded sample, wherein the ambient conditions include at least one of ambient noise or ambient light;
      determining parameters for receiving and/or transmitting signals based on the measured ambient conditions; and
      transmitting signals using the signal emitter that encode connectivity data for joining the communication group using the determined parameters, and
   wherein the connectivity data for joining the communication group includes one or more of URLs, email addresses, website portal information, IP addresses, session initiation protocol uniform resource identifiers, Facebook connection information, RSS feed information, listsery information, or Twitter feed information.

50. The computing device of claim 49, wherein the transmitted signals comprise the light signals and the signal emitter is a light emitter, and wherein the processor is configured with processor-executable instructions to perform operations such that the light signals encode the connectivity data for joining the communication group in one or more of colors, patterns, symbols, lights, or imagery.

51. The computing device of claim 50, wherein the processor is configured with processor-executable instructions to perform operations such that the light signals encode the connectivity data for joining the communication group in distinct light elements corresponding to predefined signaling information including predefined sequences and symbols.

52. The computing device of claim 49, wherein:
the signal emitter is a speaker; and
the processor is configured with processor-executable instructions to perform operations such that the transmitted signals comprise sound signals that include one or more of emitted tones, sounds, musical notes, voices, noise, notes, beeps, clicks, or ultrasound.

53. The computing device of claim 52, wherein the processor is configured with processor-executable instructions to perform operations such that the sound signals encode the connectivity data for joining the communication group in identify distinct sound elements including predefined sound sequences.

54. The computing device of claim 49, further comprising a sensor configured to receive at least one of the sound signals or the light signals, wherein the processor is coupled to the sensor,
wherein the processor is configured with processor-executable instructions to perform operations further comprising:
receiving, using the sensor, signals emitted by the mobile device, wherein the received signals are at least one of the light signals received using a camera or the sound signals received using a microphone;
decoding the received signals to obtain information indicating a preferred mode for the mobile device to receive signals from the computing device, wherein the preferred mode describes a characteristic, type, or format of the signals emitted by the computing device; and
transmitting the signals encoding the connectivity data for joining the communication group according to the preferred mode.

55. A non-transitory processor-readable storage medium having stored thereon processor-executable instructions configured to cause a processor to perform operations for a mobile device to join a communication group comprising:
measuring ambient conditions within a recorded sample, wherein the ambient conditions include at least one of ambient noise or ambient light;
determining parameters for receiving and/or transmitting signals based on the measured ambient conditions;
receiving signals emitted by a signaling device using the determined parameters, wherein the received signals are at least one of light signals or sound signals;
processing the received signals to obtain connectivity data for joining the communication group encoded within the received signals, wherein the connectivity data includes a digital address affiliated with the communication group; and
transmitting messages to join the communication group using the obtained connectivity data when a user of the mobile device is not already a member of the communication group.

56. The non-transitory processor-readable storage medium of claim 55, wherein the obtained connectivity data for joining the communication group includes one or more of URLs, email addresses, website portal information, IP addresses, session initiation protocol uniform resource identifiers, Facebook connection information, RSS feed information, listserv information, or Twitter feed information.

57. The non-transitory processor-readable storage medium of claim 55, wherein the stored processor-executable instructions are configured to cause the processor to perform operations such that receiving the signals emitted by the signaling device comprises receiving the light signals using a camera on the mobile device.

58. The non-transitory processor-readable storage medium of claim 57, wherein the light signals encode the connectivity data for joining the communication group in one or more of colors, patterns, symbols, lights, or imagery.

59. The non-transitory processor-readable storage medium of claim 57, wherein the stored processor-executable instructions are configured to cause the processor to perform operations such that processing the received signals to obtain connectivity data for joining the communication group encoded within the received signals comprises:
performing image processing routines on the received light signals to identify distinct light elements;
comparing the distinct light elements to predefined signaling information, wherein the predefined signaling information includes predefined sequences and symbols, wherein the sequences include light elements having at least one of varying frequency, varying intensity, or varying duration; and
decoding the distinct light elements to obtain the connectivity data for joining the communication group when the distinct light elements match the predefined signaling information based on the comparison.

60. The non-transitory processor-readable storage medium of claim 55, wherein the stored processor-executable instructions are configured to cause the processor to perform operations such that receiving the signals emitted by the signaling device comprises receiving the sound signals with a microphone on the mobile device.

61. The non-transitory processor-readable storage medium of claim 60, wherein the sound signals include one or more of emitted tones, sounds, musical notes, voices, noise, notes, beeps, clicks, or ultrasound.

62. The non-transitory processor-readable storage medium of claim 60, wherein the stored processor-executable instructions are configured to cause the processor to perform operations such that processing the received signals to obtain connectivity data for joining the communication group encoded within the received signals comprises:
performing audio processing routines on the received sound signals to identify distinct sound elements;
converting the identified distinct sound elements to distinct data values based on predefined thresholds;
comparing the distinct data values to predefined signaling information, wherein the predefined signaling information includes predefined sequences, wherein the sequences include sound elements having at least one of varying frequency, varying volume, varying pitch, or varying duration; and
decoding the distinct data values to determine connectivity data when the distinct data values match the predefined signaling information based on the comparison.

63. The non-transitory processor-readable storage medium of claim 55, wherein the stored processor-executable instructions are configured to cause the processor to perform operations further comprising emitting one of the sound signals or the light signals to indicate a preferred mode for receiving the signals from the signaling device, wherein the preferred mode describes a characteristic, type, or format of the signals emitted by the signaling device, and
wherein the stored processor-executable instructions are configured to cause the processor to perform operations such that receiving the signals emitted by the signaling device comprises receiving the signals emitted by the signaling device according to the preferred mode.

64. The non-transitory processor-readable storage medium of claim 55, wherein the stored processor-executable instructions are configured to cause the processor to perform operations further comprising:
detecting a representation of an unknown third-party within the received signals;
transmitting to the communication group a query message that includes the detected representation and requests an identity of the unknown third-party; and
receiving a message including the identity of the unknown third-party from the communication group.

65. The non-transitory processor-readable storage medium of claim 64, wherein the detected representation of the unknown third-party includes at least one of an image of a face of the unknown third-party, an image of a body of the unknown third-party, an image of clothing of the unknown third-party, or sound of a voice of the unknown third-party.

66. The non-transitory processor-readable storage medium of claim 55, wherein the stored processor-executable instructions are configured to cause the processor to perform operations further comprising:
determining whether a first signal within the received signals can be accurately decoded, wherein the first signal is of a first signal type that is one of a sound signal or a light signal;
activating a sensor associated with a second signal type when it is determined the first signal cannot be accurately decoded, wherein the sensor is one of a camera or a microphone; and
processing a second signal within signals received with the activated sensor when it is determined the first signal cannot be accurately decoded, wherein the second signal is of the second signal type that is different from the first signal type,
wherein the stored processor-executable instructions are configured to cause the processor to perform operations such that processing the received signals comprises determining whether the received signals include complete connectivity data that can be used for joining the communication group.

67. A non-transitory processor-readable storage medium having stored thereon processor-executable software instructions configured to cause a processor to perform operations for a computing device to communicate connectivity data to enable a mobile device to join a communication group, comprising:
measuring ambient conditions within a recorded sample, wherein the ambient conditions include at least one of ambient noise or ambient light;
determining parameters for receiving and/or transmitting signals based on the measured ambient conditions; and
transmitting signals that encode connectivity data for joining the communication group using the determined parameters, wherein the signals are at least one of light signals or sound signals, and
wherein the connectivity data for joining the communication group includes one or more of URLs, email addresses, website portal information, IP addresses, session initiation protocol uniform resource identifiers, Facebook connection information, RSS feed information, listsery information, or Twitter feed information.

68. The non-transitory processor-readable storage medium of claim 67, wherein the transmitted signals comprise light signals emitted by a light emitter, wherein the light signals encode the connectivity data for joining the communication group in one or more of colors, patterns, symbols, lights, or imagery.

69. The non-transitory processor-readable storage medium of claim 68, wherein the light signals encode the connectivity data for joining the communication group in distinct light elements corresponding to predefined signaling information including predefined sequences and symbols.

70. The non-transitory processor-readable storage medium of claim 67, wherein the transmitted signals comprise the sound signals emitted from a speaker, wherein the sound signals include one or more of emitted tones, sounds, musical notes, voices, noise, notes, beeps, clicks, or ultrasound.

71. The non-transitory processor-readable storage medium of claim 70, wherein the sound signals encode the connectivity data for joining the communication group in identify distinct sound elements including predefined sound sequences.

72. The non-transitory processor-readable storage medium of claim 67, wherein the stored processor-executable instructions are configured to cause the processor to perform operations further comprising:
receiving signals emitted by the mobile device, wherein the received signals are at least one of the light signals received using a camera or the sound signals received using a microphone;
decoding the received signals to obtain information indicating a preferred mode for the mobile device to receive signals from the computing device, wherein the preferred mode describes a characteristic, type, or format of the signals emitted by the computing device; and
transmitting the signals encoding the information connectivity data for joining the communication group according to the preferred mode.

73. A communication system, comprising:
a server configured to manage a communication group communication;
a mobile device; and
a signaling device,
wherein the mobile device comprises:
a first memory;
a light sensor;
a microphone;
a first network interface configured to communicate with a network; and
a first processor coupled to the first memory, the first network interface, the light sensor and the microphone, wherein the first processor is configured with processor-executable instructions to perform operations comprising:
measuring ambient conditions within a first recorded sample of ambient noise or ambient light;
determining first parameters for one or both of receiving and transmitting signals based on the measured ambient conditions;
receiving, using at least one of the light sensor or the microphone, signals emitted by the signaling device using the determined first parameters, wherein the received signals are at least one of light signals or sound signals;

processing the received signals to obtain connectivity data for joining a communication group encoded within the received signals, wherein the connectivity data includes a digital address affiliated with the communication group; and transmitting to the server via the first network interface messages to join the communication group using the obtained connectivity data when a user is not already a member of the communication group, wherein the signaling device comprises:
a second memory;
a second signal emitter configured to emit at least one of sound signals or light signals, and
a second processor coupled to the second memory and the second signal emitter, wherein the second processor is configured with processor-executable instructions to perform operations comprising:
measuring the ambient conditions within a second recorded sample;
determining second parameters for one or both of receiving or transmitting signals based on the measured ambient conditions; and
transmitting, using the determined second parameters and the second signal emitter, the signals encoding the connectivity data for joining the communication group, and wherein the server comprises:
a second network interface configured to communicate with the network; and
a third processor coupled to the second network interface and configured with server-executable instructions to perform operations comprising:
receiving via the second network interface from the mobile device the connectivity data for joining the mobile device to the communication group; and
joining the mobile device to the communication group based on the received connectivity data.

74. The communication system of claim 73, wherein the connectivity data for joining the communication group includes one or more of URLs, email addresses, website portal information, IP addresses, session initiation protocol uniform resource identifiers, Facebook connection information, RSS feed information, listsery information, or Twitter feed information.

75. The communication system of claim 73, wherein the first processor is configured with processor-executable instructions to perform operations such that receiving, using at least one of the light sensor or the microphone, signals emitted by the signaling device using the determined first parameters comprises receiving the light signals using the light sensor, wherein the light sensor is a camera, and
wherein the second signal emitter in the signaling device is a light emitter.

76. The communication system of claim 75, wherein the light signals encode the connectivity data for joining the communication group in one or more of colors, patterns, symbols, lights, or imagery.

77. The communication system of claim 75, wherein the first processor is configured with processor-executable instructions to perform operations such that processing the received signals to obtain connectivity data for joining the communication group encoded within the received signals comprises:
performing image processing routines on the received light signals to identify distinct light elements;
comparing the distinct light elements to predefined signaling information, wherein the predefined signaling information includes predefined sequences and symbols, wherein the sequences include light elements having at least one of varying frequency, varying intensity, or varying duration; and
decoding the distinct light elements to obtain the connectivity data for joining the communication group when the distinct light elements match the predefined signaling information based on the comparison.

78. The communication system of claim 73, wherein the first processor is configured with processor-executable instructions to perform operations such that receiving, using at least one of the light sensor or the microphone, signals emitted by the signaling device using the determined first parameters comprises receiving the sound signals with the microphone, and
wherein the second signal emitter in the signaling device is a speaker.

79. The communication system of claim 78, wherein the sound signals include one or more of emitted tones, sounds, musical notes, voices, noise, notes, beeps, clicks, or ultrasound.

80. The communication system of claim 78, wherein the first processor is configured with processor-executable instructions to perform operations such that processing the received signals to obtain connectivity data for joining the communication group encoded within the received signals comprises:
performing audio processing routines on the received sound signals to identify distinct sound elements;
converting the identified distinct sound elements to distinct data values based on predefined thresholds;
comparing the distinct data values to predefined signaling information, wherein the predefined signaling information includes predefined sequences, wherein the sequences include sound elements having at least one of varying frequency, varying volume, varying pitch, or varying duration; and
decoding the distinct data values to determine connectivity data when the distinct data values match the predefined signaling connectivity data based on the comparison.

81. The communication system of claim 73, wherein the mobile device further comprises:
a first signal emitter configured to emit at least one of the sound signals or the light signals, wherein the first processor is coupled to the first signal emitter, and
wherein the first processor is configured with processor-executable instructions to perform operations further comprising emitting, using the first signal emitter, signals indicating a preferred mode for receiving the signals from the signaling device, wherein the preferred mode describes a characteristic, type, or format of the signals emitted by the signaling device,
wherein the first processor is configured with processor-executable instructions to perform operations such that receiving, using at least one of the light sensor or the microphone, signals emitted by the signaling device comprises receiving the signals emitted by the signaling device according to the preferred mode,
wherein the signaling device further comprises a second sensor configured to receive at least one of the sound signals or the light signals, wherein the second processor is coupled to the second sensor, and wherein the second processor is configured with processor-executable instructions to perform operations further comprising:
- receiving, via the second sensor, the signals emitted by the mobile device that indicate the preferred mode;
- decoding the received signals emitted by the mobile device to obtain information indicating the preferred mode; and
- transmitting, using the second signal emitter, the signals encoding the connectivity data for joining the communication group according to the preferred mode.

82. The communication system of claim 73, wherein the first processor is configured with processor-executable instructions further comprising:
- detecting a representation of an unknown third-party within the received signals emitted by the signaling device;
- transmitting via the first network interface a query message that includes the detected representation and requests an identity of the unknown third-party; and
- receiving via the first network interface a message including the identity of the unknown third-party.

83. The communication system of claim 82, wherein the detected representation of the unknown third-party includes at least one of an image of a face of the unknown third-party, an image of a body of the unknown third-party, an image of clothing of the unknown third-party, or sound of a voice of the unknown third-party.

84. The communication system of claim 73, wherein the mobile device wherein the first processor is configured with processor-executable instructions to perform operations further comprising:
- determining whether a first signal within the received signals emitted by the signaling device can be accurately decoded, wherein the first signal was received by one of the light sensor or the microphone;
- activating the other of the light sensor and the microphone when it is determined the first signal cannot be accurately decoded; and
- processing a second signal within the received signals emitted by the signaling device when it is determined the first signal cannot be accurately decoded, wherein the second signal was received by the other of the light sensor and the microphone, and
- wherein the first processor is configured with processor-executable instructions to perform operations such that processing the received signals comprises determining whether the received signals emitted from the signaling device include complete connectivity data that can be used for joining the communication group, and
- wherein the signaling device further comprises a first signal emitter coupled to the second processor, and
- wherein the second processor is configured with processor-executable instructions to perform operations such that transmitting, using the determined second parameters and the second signal emitter, the signals comprises transmitting the signals using the first signal emitter and the second signal emitter.

\* \* \* \* \*